United States Patent
Haandrikman et al.

(10) Patent No.: US 6,390,114 B1
(45) Date of Patent: May 21, 2002

(54) METHOD AND APPARATUS FOR SUPPRESSING AND CONTROLLING SLUGFLOW IN A MULTI-PHASE FLUID STREAM

(75) Inventors: Gritienus Haandrikman; Rudolphus Aloysius Wijnandus Maria Henkes; Marinus Gerardus Wilhelmus Maria Seelen; Aloysius Johannes Nicolaas Vreenegoor, all of Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/708,321

(22) Filed: Nov. 8, 2000

(30) Foreign Application Priority Data

Nov. 8, 1999 (EP) .............................. 99203727

(51) Int. Cl.⁷ ................................ G05D 7/06
(52) U.S. Cl. ........................... 137/2; 137/187
(58) Field of Search ..................... 137/2, 187

(56) References Cited

U.S. PATENT DOCUMENTS

| | | |
|---|---|---|
| 5,256,171 A | 10/1993 | Payne |
| 5,377,714 A | 1/1995 | Giannesini et al. |
| 5,494,067 A | 2/1996 | Levallois |
| 5,544,672 A | 8/1996 | Payne et al. |
| 5,711,338 A | 1/1998 | Talon |

FOREIGN PATENT DOCUMENTS

| | | |
|---|---|---|
| EP | 0410522 B1 | 5/1994 |
| EP | 00767699 B1 | 9/1998 |
| JP | 63/274408 A2 | 11/1988 |

OTHER PUBLICATIONS

"Choking can eliminate severe pipeline slugging", *Oil and Gas Journal*, Nov. 12, 1979, pp. pp. 230–238.

Primary Examiner—Gerald A. Michalsky

(57) ABSTRACT

Disclosed is a method for suppressing and controlling liquid slugs and gas surges in a stream of multiphase fluid flowing from a flowline into a gas/liquid separator having a liquid outlet with a liquid flow control valve, and a gas outlet with a gas flow control valve, and a control system for monitoring said control variables and adjusting said control valves which comprises:

a) Measuring at least one control variable selected from the group of the liquid level in the separator, the liquid flow rate in the liquid outlet, the gas flow rate in the gas outlet, the sum of the liquid flow rate in the liquid outlet and the gas flow rate in the gas outlet, and the fluid pressure at or near the separator;

b) Entering said measurements to a control system with a controller for receiving said values as a mathematical number and responding to preset numbers;

c) Said control system adjusting said liquid and gas flow control valves to reduce a difference between a selected control variable and a pre-set reference value of the selected control variable; and d) Changing the selected control variable from time to time automatically if one or more control variables reaches a pre-set value.

12 Claims, 15 Drawing Sheets

Figure 5.4 Pressure in the mini separator

Figure 5.5 Level fluctuations at the test separator

METHOD AND APPARATUS FOR SUPPRESSING AND CONTROLLING SLUGFLOW IN A MULTI-PHASE FLUID STREAM

FIELD OF THE INVENTION

The invention relates to the suppression and control of slug flow in a multi-phase fluid stream. More particularly, the invention relates to a method and apparatus for suppressing and controlling liquid slugs and gas surges in a stream of multi-phase fluid flowing through a pipeline or a flowline system, which may include a riser section and a gas/liquid separator or slugcatcher located downstream of the pipeline outlet or the riser section.

BACKGROUND OF THE INVENTION

In the oil and gas industry it is common practice to transport a multiphase fluid containing crude oil or condensate, water and gas from a well through a single pipeline system to a process facility. For example, in case of offshore oil production, crude oil, production water, and associated gas are generally simultaneously transported through a single subsea pipeline to gas/liquid separating equipment located onshore or on an offshore platform. Several flow regimes are known to occur in such a stream of multiphase fluid, including stratified flow, core flow, mist flow, and slug flow. Of these flow regimes, slug flow is generally to be avoided as it consists of alternating batches of liquid (termed slugs) and gas surges. Under certain flow conditions growth of liquid slugs may easily occur, thus leading to severe slugging characterized by a flow pattern of alternating production starvation (no flow), large liquid slugs, and strong gas surges at the exit of the flowline system. Large liquid slugs can also be generated by operational changes, e.g. the increase of the fluid production during the start-up of a pipeline. Supplying such an alternating pattern of liquid slugs and gas surges to a gas/liquid separator strongly reduces the efficiency of the separator, as the gas/liquid separator must be operated with acceptable pressure fluctuations and should deliver an acceptably low liquid content in the gas outlet conduit and an acceptably low gas content in the liquid outlet conduit.

A method for preventing slug growth in a pipeline system during simultaneous transportation of a gas and a liquid through the pipeline system is disclosed in Oil & Gas Journal, Nov. 12, 1979. In this known method a valve is arranged at the top of a riser, which valve is manually or automatically regulated so as to minimize the pipeline pressure upstream of the riser and to minimize the differential pressure fluctuations in the riser. Transmitters are used to transmit pressure signals for regulating the valve, which transmitters are installed at a subsea part of the pipeline system. This known method is based on the assumption that severe slugging only occurs in pipelines having a section of downward inclination when seen in the direction of flow and that slug growth can be prevented by regulating the volumetric fluid flux as a function of fluid pressure variations.

JP63274408A2 discloses a separator control apparatus which adjusts a valve in a gas outlet of a gas liquid separator by adding the outputs of a supersonic multiphase flowmeter in the inlet of the separator and of a manometer within the separator to exert a constant pressure in the separator.

EP410522B1, assigned to Shell, and incorporated by reference herein in the entirety, discloses a method of preventing slug growth in a stream of multiphase fluid flowing from a flow line into a gas/liquid separator by providing a means of fluid control to manipulate the fluid flow rate. This method comprises measuring the liquid flow rate in the liquid outlet of the separator and the gas flow rate in the gas outlet thereof, determining the fluid flux defined as the sum of the liquid flow rate and the gas flow rate, and operating the fluid flow rate control means so as to reduce a variation of the fluid flux. A drawback of EP410522B1 and of the method disclosed in JP63274408A2 is that measurement of the sum of the liquid and gas flow rates in a multiphase fluid stream is difficult and requires complex measuring equipment.

U.S. Pat. Nos. 5,256,171; 5,377,714; 5,494,067; 5,544,672 and 5,711,338 disclose slug suppression methods in which the liquid level in a gas-liquid separation vessel is held as constant as possible. A disadvantage of these methods is that said liquid level is not always the best control parameter and that occasionally, e.g. during start-up still manual control or intervention is required.

The method of EP00767699B1, assigned to Shell, and incorporated by reference herein in the entirety, comprises the steps of:

a) measuring at least one control variable selected from the group consisting of the liquid level in the separator, the liquid flow rate in the liquid outlet of the separator, the gas flow rate in the gas outlet of the separator, the sum of the liquid flow rate in the liquid outlet and the gas flow rate in the gas outlet, and the fluid pressure at or near the separator; and b) operating said liquid flow rate control means essentially on the basis of said measurements so as to reduce a difference between said liquid level and a selected reference value of the liquid level, and so as to reduce a difference between said control variable and a selected reference value of the control variable.

Field experience with the method according to EP00767699B1 has demonstrated that this method significantly suppresses slug flow in a multi-phase fluid stream, but that, due to the origin of the liquid slugs, some slugs were suppressed to a more limited extent than other slugs. In addition, the method of EP00767699B1 requires significant monitoring and is not operated automatically.

It would be very desirable in the art if a method were available for slug suppression that could be operated automatically. The method and apparatus of the present invention provides such a method for slug suppression and control that can be operated without human intervention using a control system with feedback and selected set-points to trigger adjustments in the system.

SUMMARY OF THE INVENTION

In accordance with the foregoing the present invention is an improved method for suppressing and controlling liquid slugs and gas surges in a stream of multiphase fluid flowing from a flowline into a gas/liquid separator which has a liquid outlet provided with a liquid flow control valve, and a gas outlet provided with a gas flow control valve, the method comprising:

1) measuring at least one control variable selected from the group of the liquid level $L_{LIQ}$ in the separator, the liquid flow rate $Q_L$ in the liquid outlet, the gas flow rate $Q_G$ in the gas outlet, the sum $(Q_L+Q_G)$ of the liquid flow rate in the liquid outlet and the gas flow rate in the gas outlet, and the fluid pressure (P) at or near the separator;

2) Inputting said measurements to a control system with a means for receiving said values as a mathematical number and responding to preset numbers;

3) Said control system adjusting said liquid and gas flow control valves to reduce a difference between a selected control variable ($Q_L+Q_G$, $Q_L$, $Q_G$, P, $L_{LIQ}$) and a pre-set reference value of the selected control variable; and 4) Changing the control variable ($Q_L+Q_G$, $Q_L$, $Q_G$, P, $L_{LIQ}$) from time to time automatically if one or more control variables reaches a pre-set value.

The Slug Suppression Device of the present invention (Hereafter referred to a SSD) provides a reliable solution to the slugging problem. The implementation of a SSD results in a stabilized production of gas and liquid. The apparatus comprises a small separator, "mini-separator", positioned between the pipeline outlet and the normal first stage separator. The SSD functions as a control valve with separate control valves for each of the two phases present in the system and with the use of conventional measuring equipment for mass flows, pressure, and level.

The control strategy of the SSD uses two modes: Total volumetric flow control and liquid control. In the total volumetric control mode the liquid valve is controlled to maintain a level set-point. In addition, the gas valve is controlled to maintain a total volumetric flow set-point. The actual flow rates are measured by the flow meters after the liquid and gas control valves. The sum of the output of the flow meters is the variable to be controlled. The set-point of the total volumetric flow is adjusted by a pressure controller in combination with certain equations. These adjustments depend on the pressure and the set-point of the pressure in the SSD and factors which depend on the size of the flowline.

BRIEF DESCRIPTION OF THE DRAWINGS

FIG. 16 is a graph showing the difference in total volumetric control when the SSD is switched on.

DETAILED DESCRIPTION OF THE INVENTION

Severe Slugging Conditions

In the present invention a method and system/apparatus which can be operated automatically were developed to prevent severe slugging. Severe slugging is an undesirable flow pattern that can occur in flow line riser systems transporting mixtures of gaseous and liquid hydrocarbons from satellite production platforms or sub-sea wells to central production platforms.

Severe slugging is the worst case of gravity induced slugs. Gravity induced slugs are formed in low points of the pipeline, where liquid accumulates and blocks the line. If the hydrostatic pressure build-up by the liquid exceeds the gas pressure build-up in the flowline, the inclined part of the line will be filled with liquid before the gas pressure will drive the liquid slug out of the line.

Severe slugging conditions are characterized by long periods of production starvation, during which no liquid and gas are produced at the top of the riser, followed by periods of surging liquid and gas production. Severe slugging can have adverse effects on both the top-side equipment and the well performance.

Figure 1:
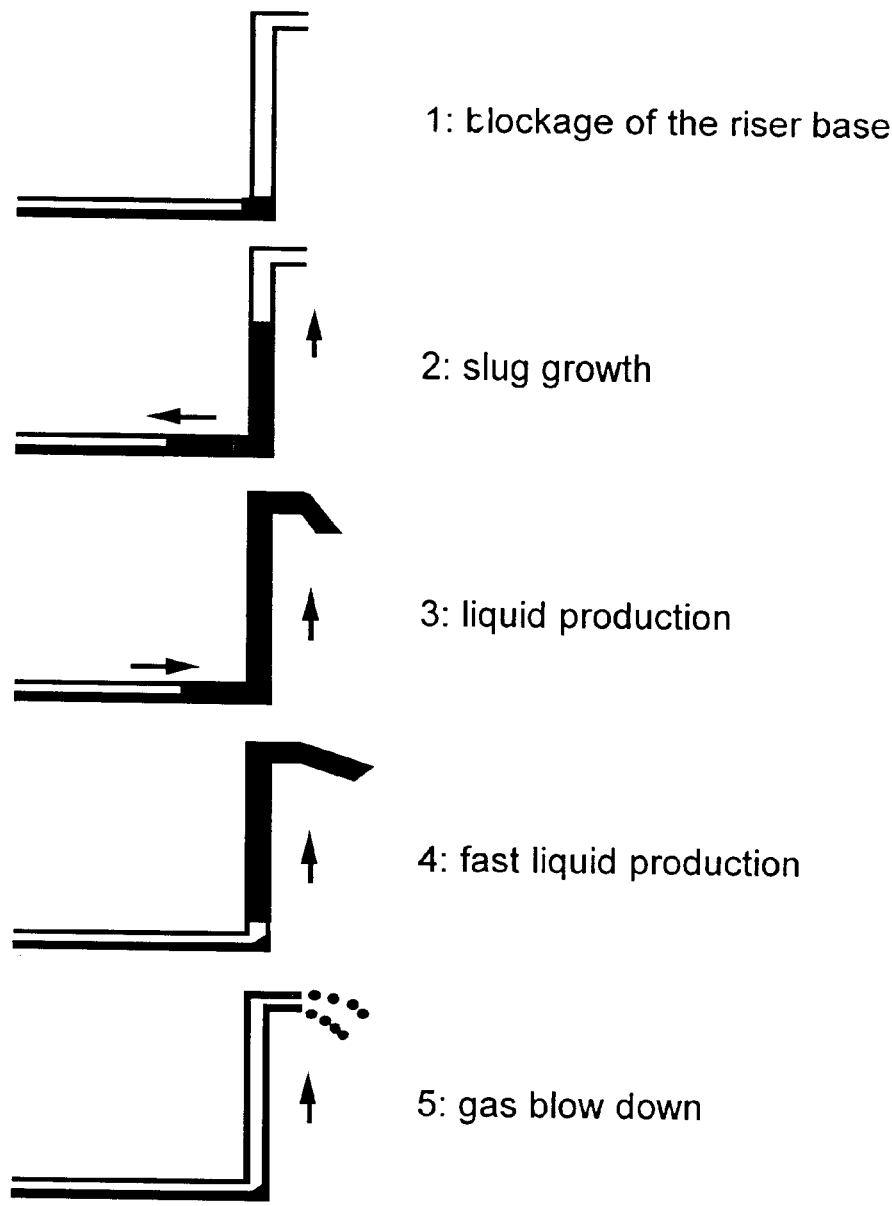
FIG. 1 shows five basic states of the severe slugging cycle.

Referring to FIG. 1, the severe slugging cycle can be divided into five basic states of the flow line riser system.

State 1: Blockage of the riser base by a liquid seal: the riser base is blocked by a liquid seal. This prevents the gas in the flow line from flowing into the riser. Consequently, there is no gas present to lift the liquid in the riser to the top (when this state occurs, the system will almost immediately go to state 2).

State 2: Slug growth: the slug grows into both the flow line and into the riser; the flow line pressure balances with the sum of the static head of the growing liquid slug in the riser and the pressure in the top of the riser. State 3 starts when the slug has reached the top of the riser.

State 3: Liquid production: liquid is produced into the separator at approximately the mixture velocity (i.e. the sum of the superficial gas and liquid velocities) in the flow line. The mixture velocity is determined by the feed at the well side. During this state, the pressure in the flow line remains approximately constant. State 4 is entered when the tail of the slug has reached the riser base.

State 4: Fast liquid production: when the tail of the slug reaches the riser base, gas will also enter the riser and penetrate into the liquid slug. This, and the ongoing production of liquid from the riser into the separator, will decrease the static head in the riser and cause an acceleration of the remaining liquid (note that the flow line pressure remains approximately constant due to the large gas volume of the flow line compared to the riser volume). State 5 begins when the gas has reached the top of the riser.

State 5: Gas blow down: the high pressure in the flow line as built up during state 2 will now rapidly decrease. This state starts with a very high gas velocity which will gradually decrease due to decrease of the flow line pressure. The initially high gas velocity creates an annular flow-pattern in the riser. The liquid in the film on the wall of the riser will have an upward velocity. However, when the gas velocity decreases sufficiently, the liquid film on the riser wall will fall down and form a seal in the riser base: the start of a new severe slugging cycle (state 1). A second, and probably more important, mechanism that causes a blockage of the riser base is the occurrence of so-called gas surge induced slugs: due to the high gas velocity in the flow line, large liquid slugs can be formed. When such a slug arrives at the riser base at a time when most of the accumulated gas has left the flow line, the gas velocity is insufficient to push the slug up to the top of the riser and this can also cause a blockage.

Transient slugs (hydrodynamic slug flow, growing slugs, start-up slugs) have another origin compared with gravity induced slugs. A transient slug can be generated by an operational change (e.g. the increase of production may affect the gas-liquid ratio in the line) or by an instability of the gas/liquid interface somewhere in the pipeline. The pipeline is not necessarily blocked by the liquid; a region with a higher liquid hold-up may travel like a wave through the pipeline. Transient slugs which are generated by an instability of the gas/liquid interface can occur under separate flow conditions and may be stable and increase in size. The method of the present invention is also effective with transient slugs.

Principle of the Invention

Figure 2:
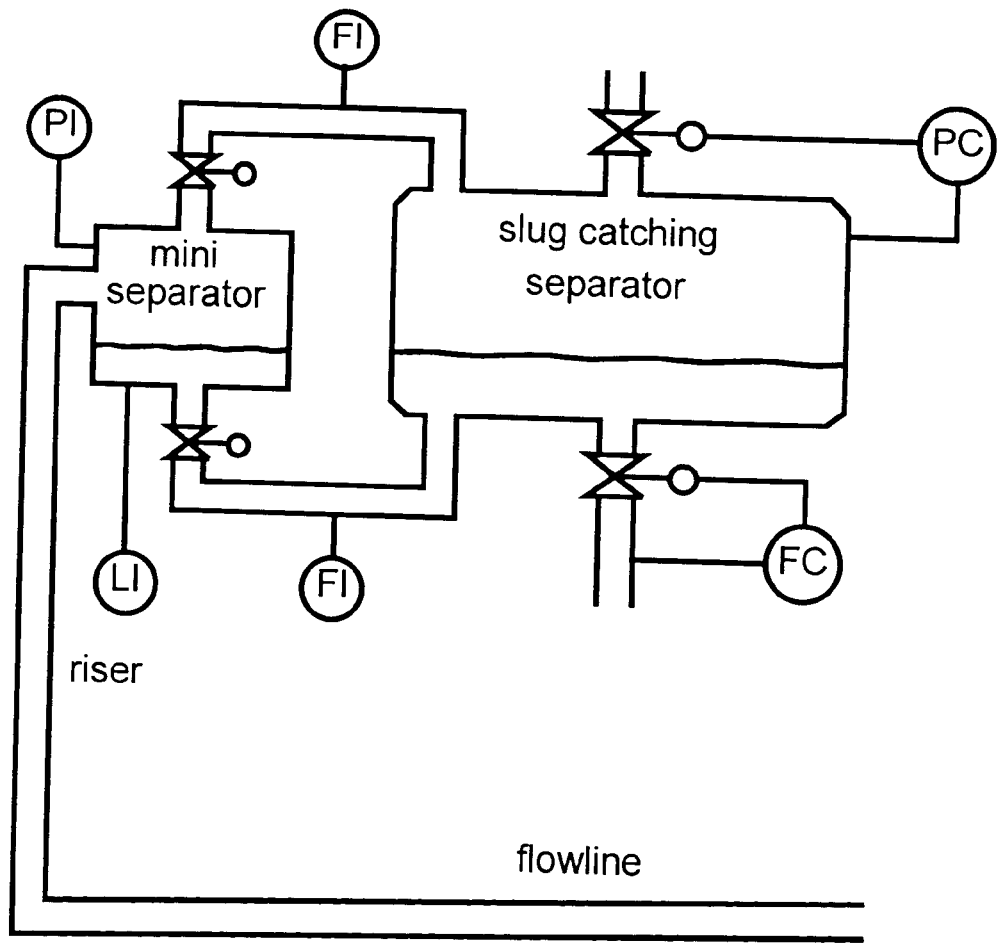
FIG. 2 is a diagram of the mini-separator of the present invention.

In the method of the present invention a small separator (SSD)(mini-separator) is positioned between the riser top and the normal slug catching separator as shown in FIG. 2. This mini-separator has two control valves, four sensors and a control system that uses the sensors to control the opening of the valves. The principle of operation of the slug suppression system is to stabilize the mixture velocity (the sum of the superficial gas and liquid velocities) in the riser.

To explain the concept of the present invention, consider a situation where there is a flowline riser system in a severe slugging mode. Assume a two-phase flow control valve is positioned at the top of the riser and the flowline riser system is in the severe slugging mode. The actions of the control valve to get the system out of the severe slugging mode and to stabilize the mixture velocity in the riser are as follows: During State 3, the liquid slug is produced with the mixture velocity, and in State 4, assuming the control valve has been completely opened at the start of State 4, the slug tends to accelerate due to the decreasing static head in the riser. The control valve must now be closed gradually in order to increase the pressure at the top of the riser. This will prevent the acceleration of the slug. Now, assuming that the control valve is capable of maintaining the liquid velocity at the mixture velocity, State 5 (the gas blow down) will not be reached since the liquid velocity is still at a controlled value when gas reaches the riser top. Then, since no acceleration has occurred, a more or less "homogeneous" flow pattern of liquid and gas bubbles (including tailor bubbles) has evolved in the riser.

Up to this point, the controller has broken the severe slugging cycle. It must now maintain the dispersed two-phase flow in the riser. Due to the operating conditions of the flowline, there is a tendency for the liquid to block the riser base again and the severe slugging cycle will start all over at State 1. By monitoring the mixture velocity in the riser top, the control valve must now be operated such that this will not occur. At a blockage, the mixture velocity at the riser top will drop and the control valve must be opened in order to achieve the liquid that blocks the riser base being pushed into the riser. However, at nominal operating conditions (i.e. with the average pressure in the top of the riser just before the control valve at a value equal to the pressure in the normal slug catching separator), the pressure cannot be lowered to have the blocking liquid slug being pushed into the riser. Therefore, the system should be operated with an increased pressure in the top of the riser compared to the non-controlled system.

During normal desirable operation of the control system, a dispersed two-phase flow is present in the riser. Because the void fraction of this two-phase flow strongly varies with time (high-frequency variations), the control of the mixture velocity using one control valve is difficult and unsatisfactory. Furthermore, the measurement of the mixture velocity in a dispersed two phase flow is not possible using conventional flow metering devices at high frequencies (existing two-phase flow measurement equipment updates typically every minute or slower). Therefore, in the present invention we have found the "ideal" control valve is implemented as a small separator (SSD)(the "mini separator"), FIG. 2. The mini-separator functions as a two-phase flow control valve. This allows for separate control valves for each of the two phases present in the system and the use of conventional measuring equipment for the measurement of the superficial gas velocity and the superficial liquid velocity.

In the practice of the invention during start-up of the control system from the unstable severe slugging mode to the (again unstable) mode of successful slug suppression, the flow pattern in the riser will change significantly. In the control scheme used for the mini-separator during start-up, special controllers are required that bring the system as fast as possible to a state in which the important process variables are as close as possible to their final values (values at successful slug suppression). This results in specifications for the control system during the start-up as discussed below. In this discussion, it is assumed that the control system is switched from manual to automatic just after a blockage of the riser base has occurred (state 1 of the severe slugging cycle), and that the liquid valve and the gas valve are 100% open (alternatively, the mini-separator can be by-passed up to this point). Because the mini-separator has only two manipulated variables (the gas valve and the liquid valve), at the most two control goals can be formulated during each part of the start-up period.

State 1: Blockage of the riser base. The duration of this state is only a fraction of a second. The controllers are still on manual; the liquid valve and the gas valve are 100% open. Consequently, no liquid is present in the separator.

State 2: Slug growth. The control system is switched to automatic at the beginning of this state. No liquid is produced from the flow line into the mini-separator. A small amount of gas is produced into the mini-separator due to the growth of the liquid slug into the riser. The control goal is to bring the pressure in the mini-separator to its final value (value used during successful slug suppression). This is achieved by a pressure controller that manipulates the gas valve. The small amount of gas flowing in from the flow line is used to achieve the required pressure, the pressure controller will vent the surplus of gas. In principle, no demand is required on the liquid valve as long as it is closed to prevent pressure loss. However, because it can not be guaranteed that no liquid will be produced (considerable lengths of horizontal piping between the riser top and the mini-separator can be present that contain liquid from the previous slug), a level controller is implemented that manipulates the liquid valve. The set-point for this controller is chosen as low as possible, however, high enough to prevent a zero level and consequent pressure loss during actions to remove unexpected incoming liquid.

State 3: Liquid production. During this state, liquid will be produced into the mini-separator. The velocity gradually increases from zero to a value equal to the mixture velocity. The control goal is now to produce this liquid without loss of the mass of gas present in the top of the mini-separator (this gas is required for preventing the slug acceleration as is explained below). This is achieved by keeping the gas valve closed. During state 3 liquid is, by definition, produced at the mixture velocity. However, in order to be prepared for the acceleration of the liquid slug in state 4, the liquid controller required in state 4 is already switched on. This controller manipulates the liquid valve and uses the measurement of the superficial liquid velocity as measured process variable.

State 4: Fast liquid production. The control system has to suppress the acceleration of the liquid slug as will occur during this state. This must be achieved by a pressure increase in the mini-separator. Because no gas is flowing into the mini-separator during the production of the liquid slug (state 3 and 4), a pressure increase can only be achieved by an increase of the liquid level and subsequent compression of the gas present in the gas cap of the mini-separator. Therefore, the gas valve must be kept closed in order to prevent gas losses (first control goal). The main control goal, prevention of the acceleration of the slug, is achieved by a controller with the liquid valve as manipulated variable and the measurement of the liquid outflow from the mini-separator (superficial liquid velocity) as variable to be controlled. The set-point for this controller is chosen equal to the mixture velocity. Consequently, the slug acceleration will cause a level increase and automatically a pressure increase, i.e. the acceleration is suppressed. Under these conditions, state 4 will end differently than under severe slugging conditions. Because the liquid velocity is controlled at a set-point, gas has more time to penetrate upward into the tail of the slug and will more gradually reach the top of the riser.

Final State: Successful Slug Suppression. As soon as gas production into the mini-separator starts, the controller structure can assume its final configuration: a level controller using the liquid valve as manipulated variable, a mixture velocity controller using the gas valve as manipulated variable, and a pressure controller to generate the set-point for the mixture velocity controller. This pressure controller is used because the flow rates from the well are usually not known exactly. An incorrect set-point of the mixture velocity controller will cause a change in the flowline hold-up. This creates a change of the average flow line and mini-separator pressure. Using a (mildly tuned) PI controller that monitors the mini-separator pressure to adapt the set-point of the mixture velocity solves this problem.

Other terms useful in the description of the invention are Pressure build-up period which is associated with the control system attempting to achieve the desired pressure in the mini-separator in State 2. Liquid production period is using the control system to prevent slug acceleration in state 3 and 4. Normal operation is the final state with successful slug suppression.

The preferred set-point for the liquid velocity controller is in between the mixture velocity and the superficial liquid velocity during normal operation. Therefore, we have used a set-point around 75% of the mixture velocity. A set-point lower than the mixture velocity makes it take longer to produce the liquid slug but, it also seems to give a smoother production.

Detailed Description of the Control Scheme

Figure 3:
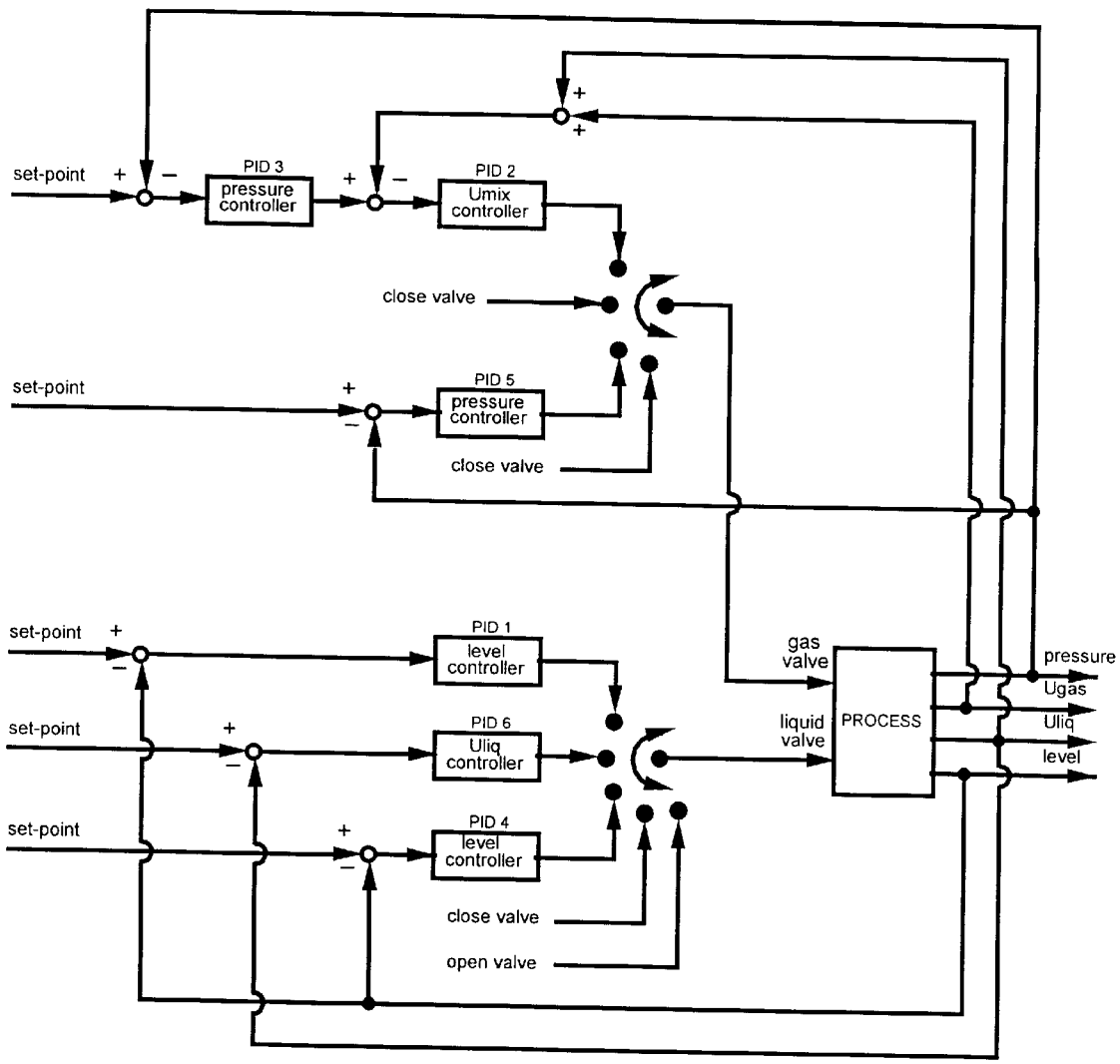
FIG. 3 shows the control scheme used in the field trial of the invention.

The functionality of the control system was implemented according to the control scheme depicted in FIG. 3. In this scheme, different controllers and/or "close valve" and "open valve" signals can be connected to the two control valves of the mini-separator (note the block named PROCESS depicts the flow line with the mini-separator. The two valves on the left-hand side of the block PROCESS are the two control valves of the mini-separator, the measurements on the right-hand side are obtained from the instrumentation connected to the mini-separator).

Figure 4:
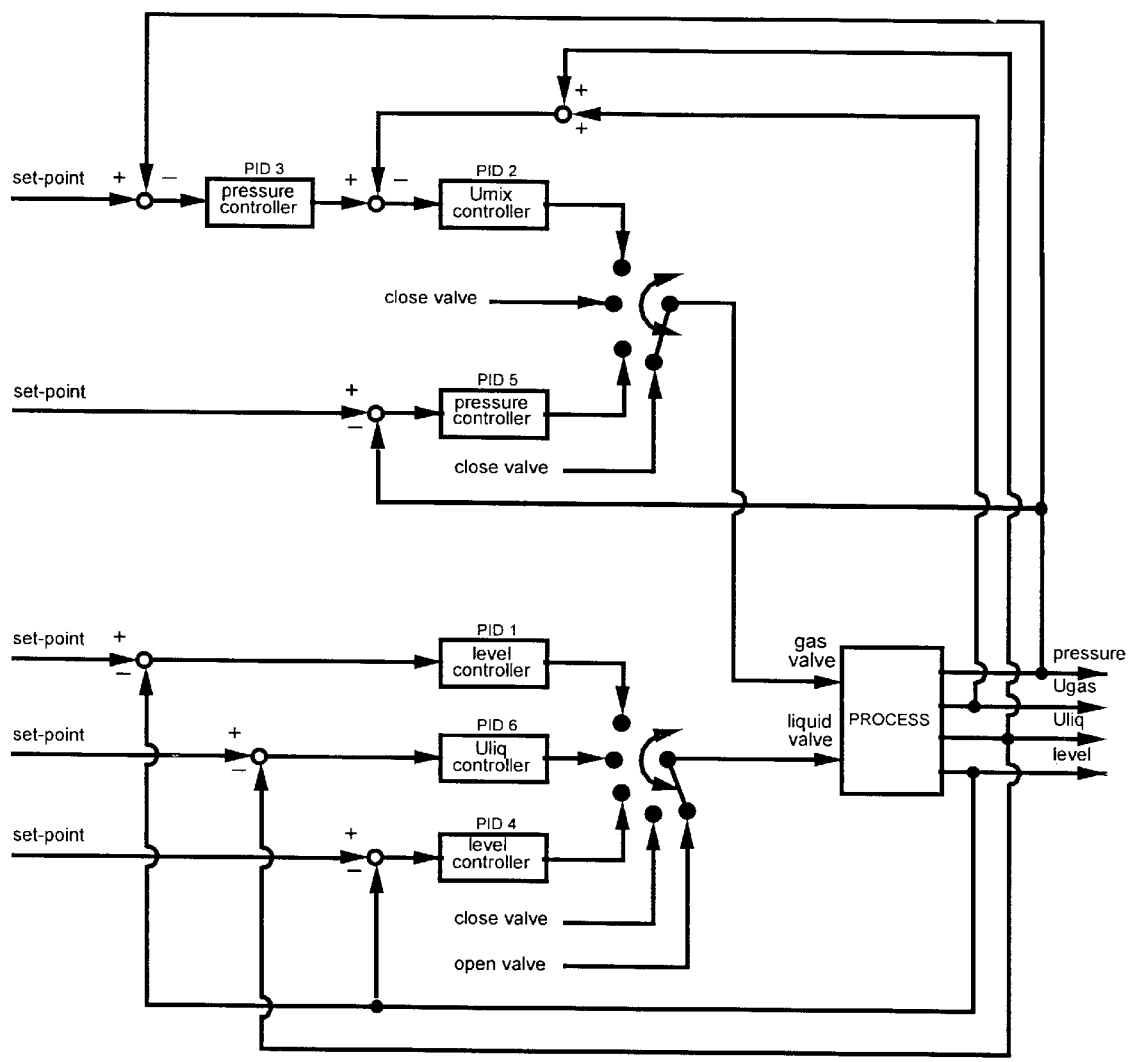
FIG. 4 is a diagram of connections to the two control valves when the controller is on manual.

Referring now to FIG. 4, when the control system is on manual, the liquid valve is 100% open and the gas valve is fully closed to prevent possible fouling of the gas flow meter and of the dry leg of the differential pressure sensor which is used for the measurement of the liquid level. Suppose that just after a blockage of the riser base has occurred, the control system is switched to automatic with a special operator on/off switch. Now, referring to FIG. 5, first the liquid valve is closed, and immediately thereafter the controllers PID 4 and PID 5 are connected to the two control valves of the mini-separator as depicted in FIG. 6. PID 4 controls the level with the liquid valve as the manipulated variable whereas PID 5 controls the pressure in the mini-separator with the gas valve as the manipulated variable. The set-point for controller PID 5 is chosen as a value equal to the set-point for the mini-separator pressure as implemented during successful slug suppression (i.e. the set-point of PID 3 below). A lower set-point can be chosen, but this results in a lower maximum of the pressure in the flow line and in the mini-separator during the suppression of the slug acceleration. As soon as liquid production starts (state 3), the control scheme switches to the configuration depicted in FIG. 7. Now the gas valve is closed and PID 6 controls the superficial liquid velocity by manipulation of the liquid valve. PID 6 remains active during state 4 and prevents the acceleration of the liquid slug. As soon as gas production from the flow line into the mini-separator is detected (see below on how this is detected) the control scheme switches to the configuration of FIG. 8, in which PID 1 controls the level in the mini-separator and PID 2 controls the mixture velocity. If, with any of the control schemes as depicted in FIGS. 3 to 8, the special operator on/off switch is changed to put the control system back into manual operation, the scheme depicted in FIG. 4 becomes active again.

The most important specifications of a suitable control system are as follows:

1. Capacity for accommodating a control scheme as shown in FIG. 3.
2. Capacity to switch between the controllers smoothly according to the principle of the suppression method as depicted in FIGS. 4 to 8.
3. Capacity to have cascaded controllers (smooth transfer of both controllers at switching).
4. Capacity to switch between controllers when signals (filtered by first-order filters) cross a certain value (greater than or lower than). It must be possible for the operator to change these values if required.
5. Capacity to calculate superficial velocities from flow rate measurements.
6. Capacity to calculate mixture velocity from superficial velocities.
7. Capacity to raise alarms to the operator when the control system switches.
8. Possess a simple way to switch the complete control system from manual to automatic and vice versa and possess flexibility of valve positions at manual (opened or closed).
9. At switch from manual to automatic, first close both valves before the controllers start manipulation of the valves.
10. Capacity for on-line tuning of the controllers and all important variables (e.g. filtering constants) by the operator, without interrupting or resetting controller calculations.

The process control computer preferably has two Central Processing Units (CPU's): a logic processor (called the "logic controller") for the handling of logic statements (often used for alarming functions and PLC like start-up and shut-down procedures) and a loop processor (called the "loop controller") for the implementation of classical control schemes as depicted in FIG. 3. This control scheme was therefore implemented in the loop controller.

Switching between the connections to the valves as depicted in FIGS. 4 to 8 is fully automated by the use of the logic controller. In the present implementation, it is detected when the flow line riser system goes back into the severe slugging mode. This can happen when a very large disturbance from the well or from the flowline has caused a liquid slug that is too large to be handled by the suppression system. In this case, the controller configuration returns to the one depicted in FIG. 7. At this point the start-up procedure is repeated as described above. This detection procedure is fully automated, however it is also possible, and possibly preferable, to either not automate the restart, or at least extend the system to give an alarm to the operator that a restart of the slug suppression controller is advised and/or executed. In the first situation, after the control system is switched from manual to automatic, no further operator intervention is required in the present implementation.

Threshold Values used for Switching

The need for a switch between the control configurations as shown in FIGS. 4 to 8 is detected by comparing measurements from the instrumentation of the mini-separator against threshold values. These threshold values are defined in the loop controller of the computer and can be changed on-line by the operator. These values are passed to the logic controller memory of the computer using write-blocks. In order to cope with measurement noise, the process signals are first filtered in the loop controller using lead-lag blocks. Parameter values used in the blocks defined in the control system were generated by the computer. In the logic controller, a dedicated address of the memory is used to indicate which of the configurations depicted in FIGS. 4 to 8 must be active. The content of this address is read by the loop controller and used to activate the required configuration. This is achieved by passing the content of this address through a number of High-Low alarm blocks, compare blocks and "not" and "or" blocks).

When the control system is switched from manual to automatic, and the control scheme depicted in FIG. 6 has become active, the logic controller monitors whether changes are required. A summary of threshold values used for switching between control schemes is given in Table 1. The switch from the pressure control period to the liquid production period (i.e. FIGS. 6 to 7) is detected by comparing the filtered measurement of the liquid outflow velocity of the mini-separator with its threshold. During pressure build-up, small amounts of liquid can be produced due to the 40 m horizontal piping between the riser top and the mini separator. Therefore, a velocity of 0.3 m/s was used as threshold in the field example.

TABLE 1

Figure 5:
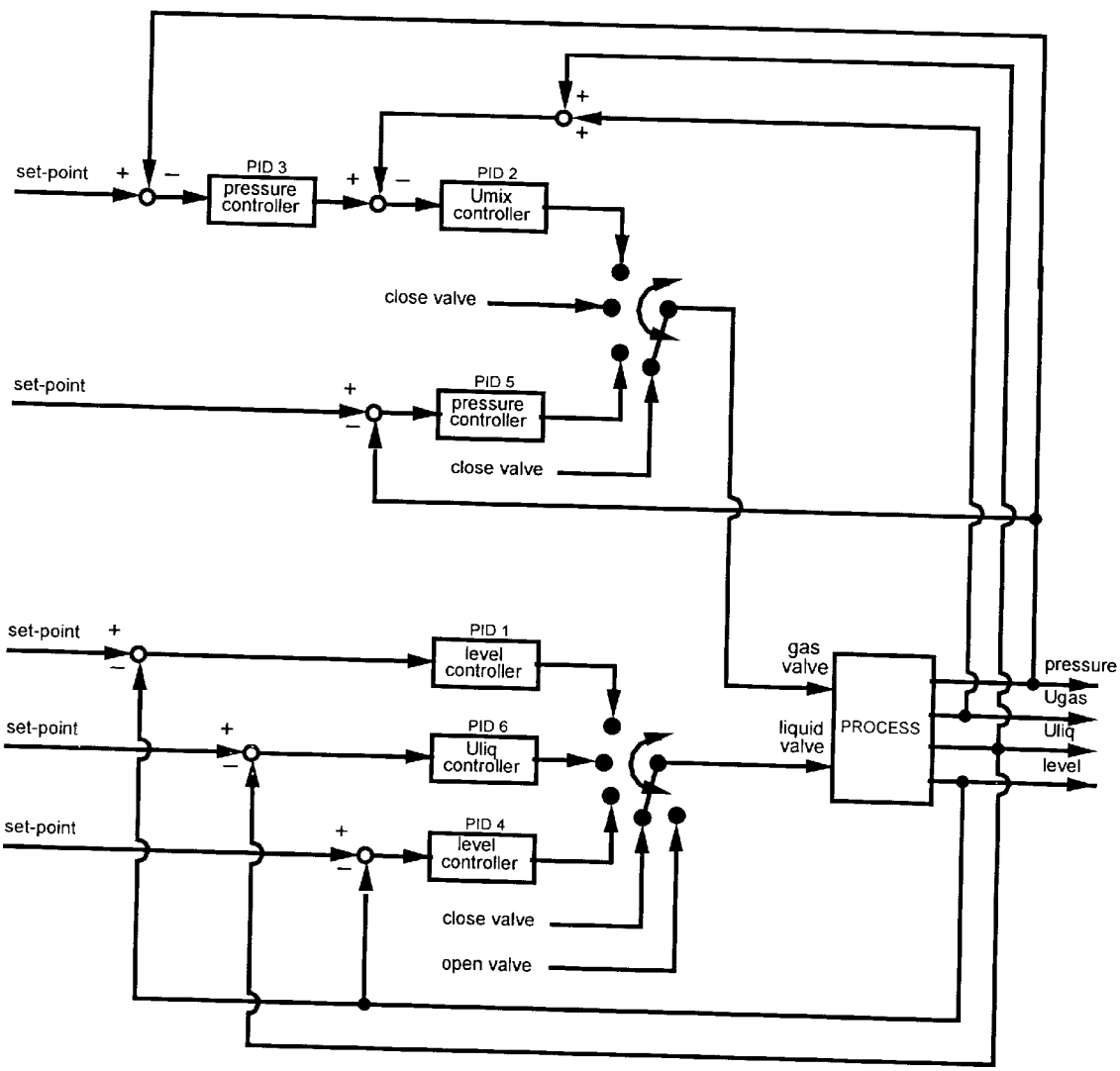
FIG. 5 is a diagram of the two control valves when the controller is switched to automatic.
Figure 6:
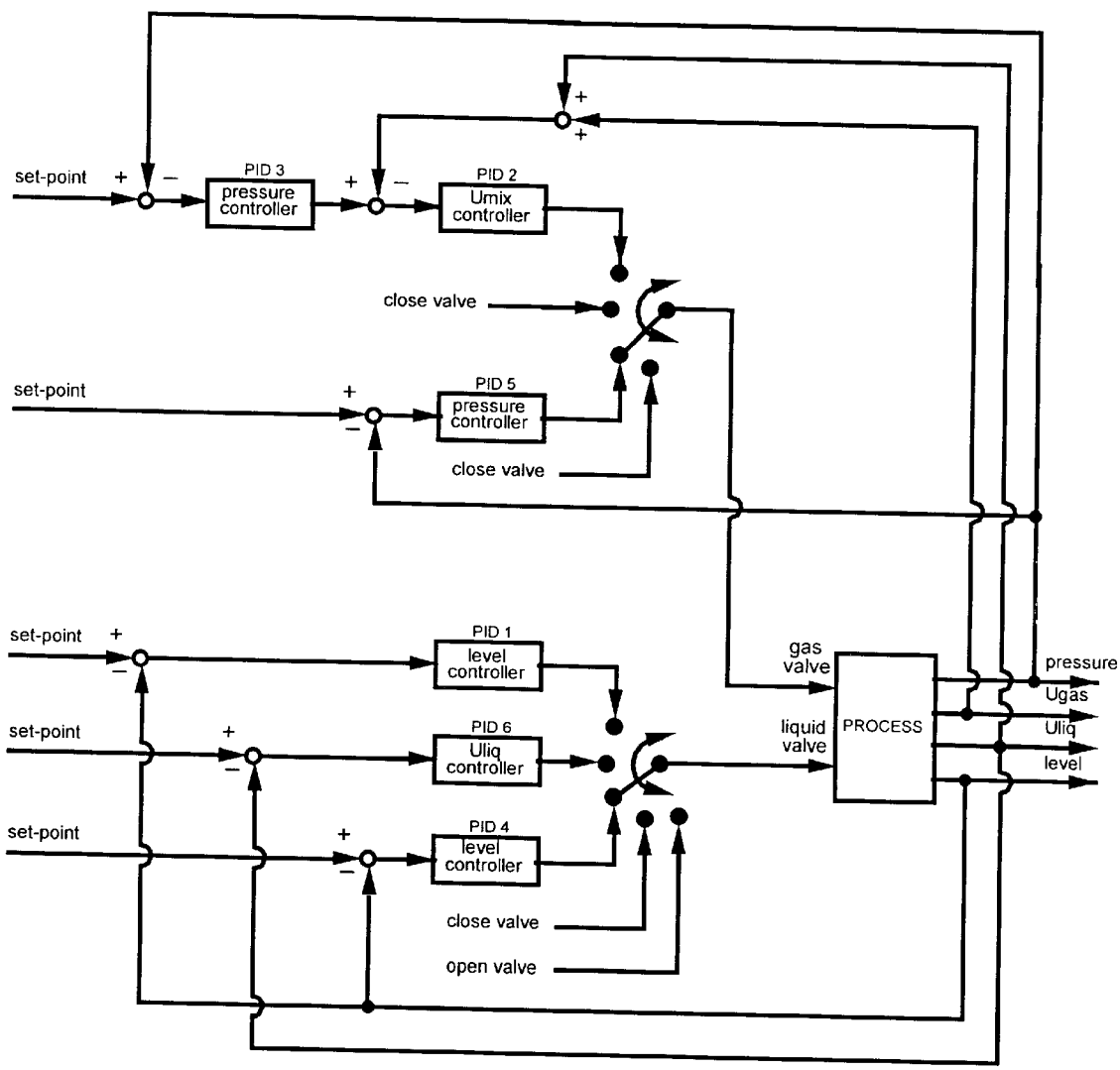
FIG. 6 is a diagram of the two control valves during a state of pressure build-up.
Figure 7:
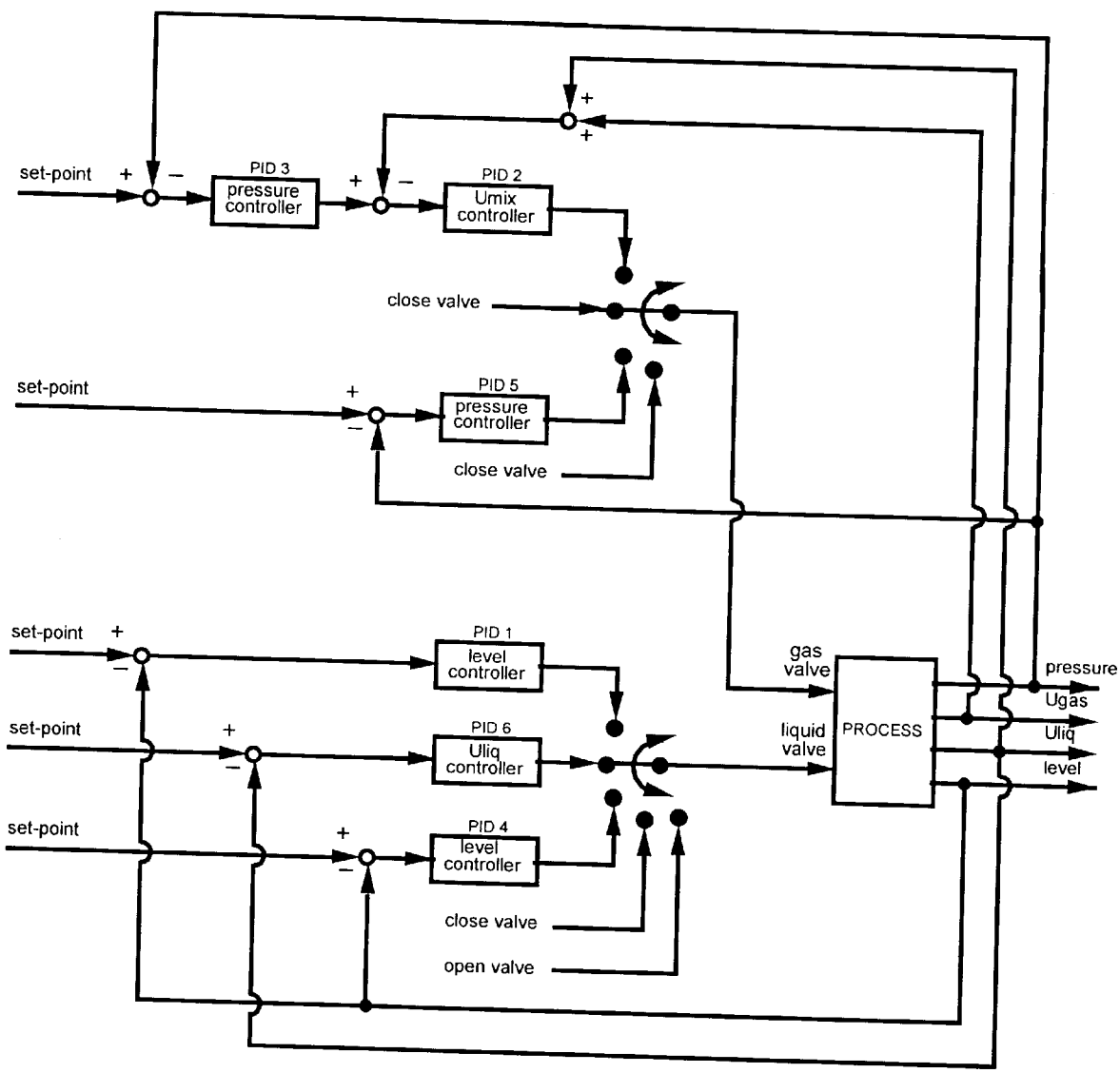
FIG. 7 is a diagram of the two control valves during the liquid production period.
Figure 8:
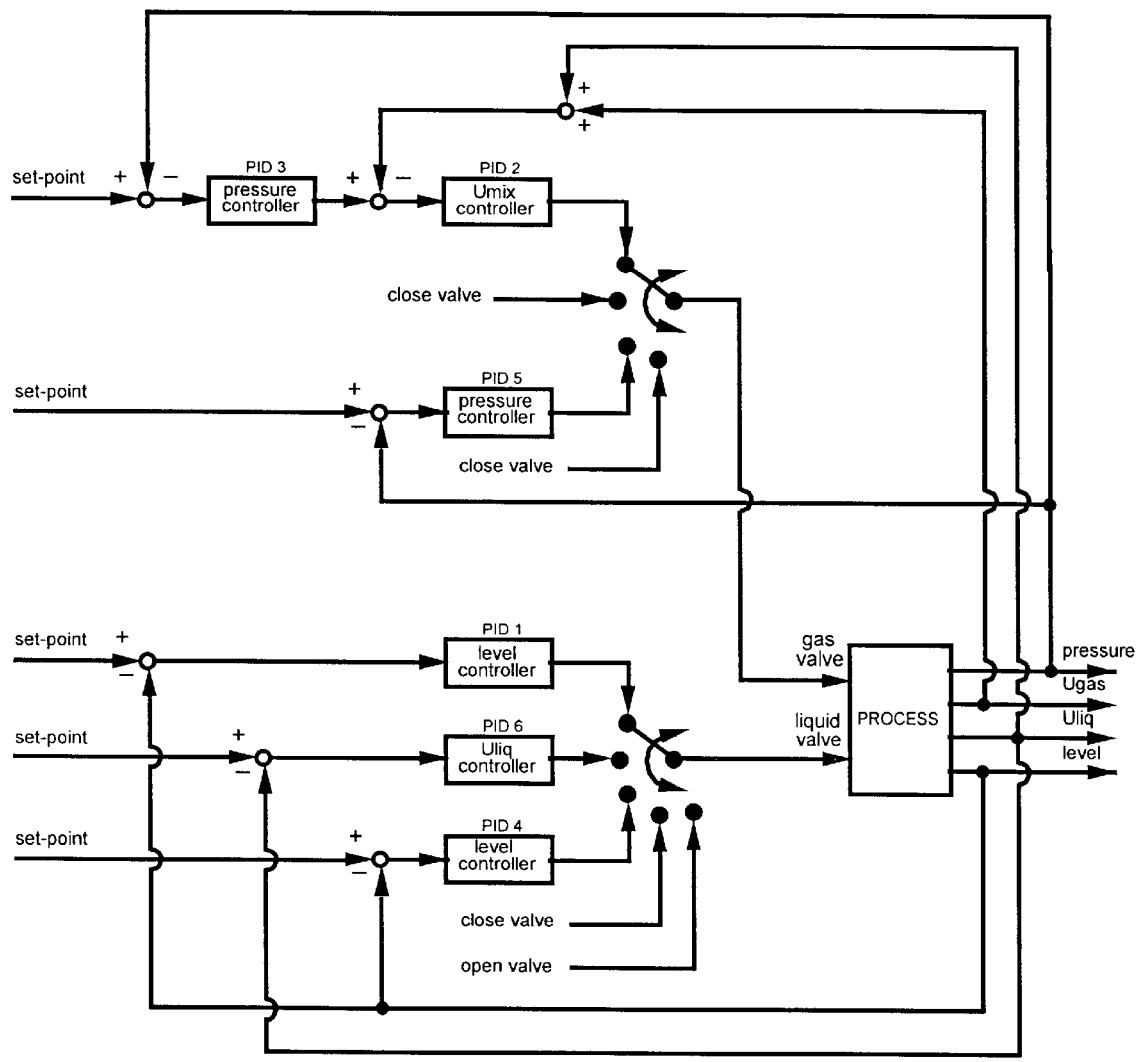
FIG. 8 is a diagram of the connections to the two control valves during normal operation.

| CONTROL SCHEME ACTIVE | MONITORED SIGNAL | SWITCH TO NEXT CONTROLLER SCHEME IF SIGNAL | CONTROL PASSED TO CONTROL SCHEME DEPICTED IN: |
|---|---|---|---|
| FIG. 6 | superficial liquid velocity | >0.3 m/s | FIG. 7 |
| FIG. 7 | liquid level | >40% | FIG. 7 |
| FIG. 7 | liquid level | <25% | FIG. 8 |
| FIG. 8 | output of level controller | >99.8% | FIG. 5 |

When the control scheme of FIG. 7 is active, the liquid level is monitored to determine when the switch to FIG. 8 is required. During the first part of the liquid production period, the tail of the slug is still in the flowline and the velocity of the liquid production is lower than or equal to the mixture velocity in the flow line (depending on the set-point of PID 6). When the tail of the slug enters the riser foot, the slug tends to accelerate due to the decreasing static head in the riser. Because PID 6 controls the liquid outflow by manipulation of the liquid valve, this decreasing static head results in an increasing liquid level and pressure in the mini-separator (this increase of the pressure prevents the acceleration of the liquid slug). When gas starts to produce from the riser into the mini-separator, liquid is replaced by gas and the level in the mini-separator will decrease (assuming no significant change in the pressure). Detection of the need for a switch from FIGS. 7 to 8 can therefore be accomplished by monitoring the liquid level; after it has increased significantly to pressurize the vessel, and subsequently started to drop, it can be concluded that gas is being produced into the mini-separator. This detection mechanism is implemented by using two thresholds (see Table 1). For the Field Example herein, a value of 40% was used to detect a significant increase of the liquid level, whereas a value of 25% was used to detect the subsequent significant decrease of the liquid level.

When the control scheme of FIG. 8 is active, the signal to the liquid valve is monitored to determine whether an unexpected problem leading to a very severe blockage of the riser foot has occurred. In this case, no liquid will be produced for a significant period of time and consequently PID 1 will close the liquid valve (send a 100% signal to the D/A converter). Detection is accomplished as indicated in Table 1. A time constant of 10 minutes is used for the filter on the liquid valve signal to have a correct detection of a severe blockage.

When, with any of the control schemes depicted in FIGS. 5 to 8 active, the control system is put back into manual operation using the special operator on/off switch for the manual/automatic transition, the scheme depicted in FIG. 4 becomes active again. The transition of the valve position just before the switch from manual to fully open for the liquid valve and fully closed for the gas valve is controlled by using special switching blocks. They change the output signals to the valves from the value just before the switch to the new demanded value at a fixed rate specified in [%/min]. This was implemented to prevent a sudden blow down of the flowline at the switch to manual.

The set-up of the computer system used during the Field Example was specially designed for the purpose of testing the severe slugging suppression concept. Therefore, some additional functionality was added/implemented in the control system. A small box with 6 operator switches and 6 indicator lights was connected to the digital I/O card of the system. The status of these switches (open or closed) and lights (on or off) is handled by the logic controller. The first 4 indication lights are used to indicate which of the control schemes is active. The manual switches 1, 2 and 4 were used to have a manual over-ride for the automatic control scheme selection (i.e. to have manual switching between FIGS. 6 to 8). This was used during the first start-up to check the switching thresholds. It can also be used to have more flexibility during the tuning of the different controllers in the control schemes. The last indicator light and operator switch were used to implement the manual/automatic status of the control system.

For safety reasons, also an emergency switch was implemented by means of a big red button. When an emergency process shut down is required, it must be possible to depressurize the piping between riser Emergency Shut Down Valve (ESDV) and the normal test separator in a simple and fast manner. In order to achieve the demanded depressurization, the two control valves must be quickly opened. This can be achieved by connecting a red button to the logic controller and to extend its program with an emergency valve opening procedure. An alternative solution is to cut the power supply to the computer system, because the valve actions are "current to close" and a loss of power to the computer system employed achieves the same goal at less programming effort. The latter solution was chosen.

Control Parameters

The control parameters can be divided into 6 different categories as shown in Table 2:

in the mini-separator. The threshold values for the level are one of the criteria for switching from total volumetric flow to liquid flow control and vice versa. In the fourth group the PID controllers are mentioned which have to be tuned for controlling the gas and liquid valve and the adaptation of the total volumetric flow. First estimates can be obtained from the test measurements of the test loop. During the field testing it was found that the test rig PID parameter settings could be used with minor adjustments. The last important group of input parameters (V) gives the valve and sensor ranges and the scaling factors to convert sensor data to engineering units. Adjustment of these input parameters is necessary when sensors or valves are changed to other dimensions or scales. In the last group(VI), the user can give input for the storage of data or data compression. The principle of design of the mini-separator was based on a scale-up of a test loop system with the assumption of equal sensor and valve dynamics. Consequently, the only difference to be expected in the dynamics of the overall system in the Field Example described herein with the test loop unit is the difference in flowline riser dynamics. However, the flowline riser dynamics, of which the higher frequency range between 0.01 Hz and 10 Hz is of particular importance, are difficult to predict quantitatively with the current dynamic models available. Therefore, the calculation of the initial settings of the controller tunings can be divided into two cases:

1. The flow line riser system dynamics are not dominant in the overall dynamics.
2. The flow line riser system dynamics are dominant in the overall dynamics.

In the first case, good initial estimates for the controller tunings can be made. These estimates of the tunings, based

TABLE 2

Overview of parameters to be set in the control system.

| I. Total Volumetric Flow Control | II. Liquid Flow Control |
|---|---|
| Low limit value | Low limit value of moving setpoint |
| High limit value | Fixed setpoint or depending on total volumetric flow |
| Start value | |
| Attenuation factor | Setpoint liquid flow (fixed) |
| Pressure drop bandwidth | Setpoint liquid flow as fraction of total volumetric flow (moving setpoint) |
| III. SSD mini-separator | IV. PID Controllers |
| Setpoint liquid level mini-separator | PID1: level controller |
| Setpoint pressure in first phase of start-up | PID2: mixture velocity |
| Setpoint of pressure during normal control | PID3: pressure |
| Time window for averaging the pressure | PID4: level of liquid |
| High limit threshold value for level | PID5: pressure in mini separator |
| Low limit threshold value for level | PID6: superficial liquid velocity |
| V. Valves, sensor ranges, data conversion | VI. Data Management |
| Output sensor ranges for the valve control | File name |
| Output ranges of sensor data (pressure, level, gas and liquid flow) | Data compression factor |
| Scaling factors for conversion of the sensor data to engineering units | File updates |

The parameters of Group I to V are determining the control function of the SSD. In the first group of control parameters the limits and the adaptation of the total volumetric flow are given. In the second group the control parameters for the liquid flow are given. The setpoint of the liquid flow can be given as a fixed value or as a fraction of the total volumetric flow. For safety reasons, a low limit value has to be given for the setpoint of the liquid flow when the fraction of total volumetric flow is used. The third group of parameters is defining the conditions (pressure and level)

on measurement ranges, mini separator sizing, etc., should result in the same closed control loop behavior for the Field Example as for the test loop system. In the second case, the controller tunings are much more difficult to establish. For a first initial estimate, the test loop tunings (scaled to account for different measurement ranges and/or $C_v$ values of the valves) can be used. In these calculations, the data presented in Table 3 to Table 6 were used. In Table 4 and 5, two columns of data are presented for the Field Example. The Field Example was done at a higher nominal pressure (25

[bar]) and consequently higher pressure drop over the mini-separator than anticipated.

This principle of calculation is to obtain the same closed loop dynamics in the field as the test loop. Here we use a transfer function defined by variables that are scaled w.r.t. their values at the nominal operating point.

$$H_{Process} = \frac{PV/PV_n}{M/M_n}$$

where the subscript "n" denotes the value at nominal operating point.

If the transfer function H is then the same, it is believed that a relative error E in the controlled variable or PV (variation relative to the value in the nominal operating point) results in an equivalent relative action on the manipulated variable M. This principle of calculation seems appropriate because the design of the mini-separator was done on the basis of a scale-up of the test loop mini-separator with equal sensor and valve dynamics. Consequently, it is expected that the reset time and rate of the field example controllers are equal to that in the test loop; only the controller gains are expected to be different.

In the second case, although some use is made of the above concept, it is expected to observe at least slower dynamics of the flowline riser system due to the larger dimensions and the larger residence times of gas and liquid.

The process transfer function for the level in the test loop and field example separators were obtained from a liquid mass balance using the following:

$$H_{process} = \frac{h_{liq}\,[\%]/h_{liq,n}\,[\%]}{\phi_l\,[kg/s]/\phi_{l,n}\,[kg/s]} = \frac{-h_{liq}\,[\%]/h_{liq,setpoint}\,[\%]}{sp_{liq}A_{sep}/\phi_{l,n}\,[kg/s]}$$

where Ø is the liquid outflow through the bottom valve and s the Laplace operator. in the (steady state) models for the valves a constant pressure equal to that at the nominal operating point is assumed (i.e. no variations between level variations and pressure).

The initial estimates were obtained by calculations using the data presented in Table 3 to Table 6. Table 3 contains the ranges of the measurement devices. All measurement devices for both the test loop and the Field Trial use 4–20 [mA] ranges as output. In the computer these [mA] signals are converted to signals with engineering units also indicated in Table 3. All PID control blocks inside the computer use the signals in engineering units as input and compute a 0–100% output. This 0–100% signal is then converted back into a 4–20[ mA] by the D/A converter. Table 4 presents the maximum flow rates through the liquid valve and the gas valve at the nominal operating pressure and fully opened valves. Table 5 lists the tunings of the controllers at the test loop and indicates how the controller names are connected to the controller names in FIG. 3.

The initial values which were used as starting point for the field tuning for the Field Example, are summarized in Table 7. For the purpose of completeness, the calculations were also performed (after the trial) with the pressure drop as actually observed during the trial. This data is presented in Table 8.

TABLE 3

Sensor ranges and ranges within the computer system (Remark: note that the range of the level sensor is larger than the height of the mini-separator. This is due to the use of the "fall-back" level indicator based on a differential pressure measurement.

|  | Test Loop | Field Example Design |
| --- | --- | --- |
| Mini separator pressure | 0–6 [bara] converted to 0–6 [bara] | 0–30 [bara] converted to 0–30 [bara] |
| Level indicator | 0–0.9 [m] converted to 0–100% | 0–1.45 [m] converted to 0–100% |
| Liquid mass flow meter | 1–3 [kg/s] converted to 0–1.5 [m/s] | 0–10.1 [kg/s] converted to 0–1.35 [m/s] |
| Gas mass flow meter | 0–24.25 [kg/s] converted to 0–0.75[m/s] | 0–0.145 [kg/s] converted to 0–1.61 [m/s] |

TABLE 4

Maximum flow rates through the liquid valve and the gas valve at the nominal operating pressure. The output blocks in the computer connected to the valves use 0–100% ranges, which are converted to 4–20 [mA] signals by the D/A converter. All valves used are current to close (v.s. air to close).

|  | Test Loop | Field Example design | Actual values at field test |
| --- | --- | --- | --- |
| Nominal operating pressure [bar] | 4 | 23 | 25 |
| Pressure drop over the valve [bar] | 2 | 3 | 5.5 |
| Liquid valve [kg/s] | 4.2 | 16.67 | 22.57 |
| Liquid valve [m/s] | 1.05 | 2.60 | 3.53 |
| Gas valve [kg/s] | 0.014 | 0.22 | 0.30 |
| Gas valve [m/s] | 3.77 | 1.29 | 1.58 |

TABLE 5

Nominal operating conditions of the test loop and the 4 inch test line.

|  | Test Loop | Field Example design | Actual values at field test |
| --- | --- | --- | --- |
| Nominal operating pressure [bar] | 3 | 22 | 25 |
| Pressure drop over the valve [bar] | 2 | 3 | 5.5 |
| Nominal liquid production [kg/s] | 0.8 | 1.41 | 0.744 |
| Nominal gas production [kg/s] | 0.0006 | 0.12 | 0.155 |
| Superficial liquid velocity [m/s] | 0.2 | 0.22 | 0.116 |
| Superficial gas velocity [m/s] | 0.16 | 0.69 | 0.818 |

TABLE 6

Controller tunings used at the test loop parameter values.

| Controller Name | Gain | Action | Reset time [min] | Rate [min] |
| --- | --- | --- | --- | --- |
| PID 1 | 0.25 | Reverse | 0.15 | 0.10 |
| PID 2 | 0.7 | Direct | 0.1 | — |
| PID 3 | 1.0 | Direct | 2.0 | — |
| PID 5 | 1.5 | Reverse | 0.15 | — |
| PID 6 | 1.5 | Direct | 0.2 | — |

TABLE 7

"Calculated" initial tunings for the Field Example controllers.
Calculations based on nominal operating pressure of 22 [bar].

| Controller Name | Gain | Action | Reset time [min] | Rate [min] |
|---|---|---|---|---|
| PID 1 | 0.44 | Reverse | 0.15 | 0.1 |
| PID 2 | 0.7 | Direct | 0.1 | — |
| PID 3 | 0.94 | Direct | 2.0 | — |
| PID 4 | 0.44 | Reverse | 0.15 | 0.1 |
| PID 5 | 1.5 | Reverse | 0.1 | — |
| PID 6 | 1.5 | Direct | 0.2 | — |

TABLE 8

"Calculated" initial tunings for the Field Example controllers.
Calculations based on nominal operating pressure of 25 [bar].

| Controller Name | Gain | Action | Reset time [min] | Rate [min] |
|---|---|---|---|---|
| PID 1 | 0.62 | Reverse | 0.15 | 0.1 |
| PID 2 | 0.7 | Direct | 0.1 | — |
| PID 3 | 0.61 | Direct | 2.0 | — |
| PID 4 | 0.62 | Reverse | 0.15 | 0.1 |
| PID 5 | 1.5 | Reverse | 0.1 | — |
| PID 6 | 1.5 | Direct | 0.2 | — |

TABLE 9

Controller tunings for Field Example after field tuning. Operating pressure of the mini-separator of 25 [bar].

| Controller Name | Gain | Action | Reset time [min] | Rate [min] |
|---|---|---|---|---|
| PID 1 | 0.5 | Reverse | 0.15 | 0.1 |
| PID 2 | 0.6 | Direct | 0.1 | — |
| PID 3 | 0.45 | Direct | 2.0 | — |
| PID 4 | 0.5 | Reverse | 0.15 | 0.1 |
| PID 5 | 2.0 | Reverse | 0.1 | — |
| PID 6 | 0.6 | Direct | 0.2 | — |

The final tunings that resulted after initial experimentation are given in Table 8. These tunings were also used in the Field Example described herein. In initial field experimentation it was found the size of the gas valve was too small. Because of this small gas valve, the mini-separator pressure had difficulty in going to its setpoint quickly after PID 1 to PID 3 became active (controller configuration of FIG. 9). Also a controller output high limit of 50% was implemented for PID 3. Consequently, PID 3 observed an error for a longer time than anticipated, resulting in a very high setpoint for PID 2 at the time the pressure reached its setpoint (wind-up effect due to the fully opened gas valve). By using the output limit to bound this wind-up, the time period required from start-up to stable operation (the time span with start-up dynamics) is reduced significantly.

In the Field Example the setpoints were used as listed in Table 10. For the interpretation of the setpoint used for PID 1 and PID 4, and the threshold values it must be remembered that the "back-up" level indicator was used with a range of 0–1.45 [m], whereas in the design of the mini-separator the nominal liquid level was intended to be at approximately 0.5 [m] in the 1.2 [m] high vessel (about half of the height between the bottom outlet and the inlet).

TABLE 10

Setpoints used during the field experiments.

| Controller name In FIG. 3 | Setpoint |
|---|---|
| PID 1 | 30 [%] |
| PID 3 | 24 [barg] |
| PID 4 | 15 [%] |
| PID 5 | 24 [barg] |
| PID 6 | 0.7 [m/s] |

From Tables 8 and 9, and our experiences in doing the actual "field tuning" (which was relatively easy and almost fully performed during the first experiment), it can be concluded that the method to obtain initial guesses was quite acceptable for arriving efficiently at a working control system for the 4 inch mini-separator. In the cases where initial guesses were obtained by calculations, the results were very close to the values used at the test loop unit (as a consequence of the scale-up of the sizing of the mini separator and the min-max ranges of both the sensors and the valves).

Description of Mini-Separator

The purpose of the Severe Slugging Suppression Device is to break the severe slugging cycle at State 4, i.e. to prevent acceleration of the liquid in the riser, and to maintain a steady production of oil and gas at the inlet of the primary separator.

We have found the method requires multi-phase flow measurements with a sufficiently short response time. This can only be accomplished by the use of a small separator, and individual measurement of gas and liquid flows using conventional flow measuring techniques. The type of separator selected for the development of the method consisted of a vertical pipe with a tangential inlet. The sizing of the vessel and nozzles are aimed at most efficient separation (liquid removal>96%). For the SSD, the separation efficiency is less important, but a liquid level should be detectable and flow rates of both phases have to be measured. If the entrained liquid in the gas phase is high and/or much associated gas is present in the liquid phase the values of the flow rates will be influenced but will not corrupt the control strategy.

One of the important features of the slug suppression method is the ability to generate fast pressure variations in the mini-separator when running in total volumetric flow control. Therefore, the gas volume should be kept as small as possible. In conjunction with this, for an optimal separation, liquid level variations should be kept at a minimum. This leads to a second important requirement, i.e. that the dynamics of the control valves are fast. However, during periods with incoming slugs large variations in level may be accepted.

The sizing rules for the vessel and nozzles which are described here in detail for the field example case are aimed at most efficient separation. In some applications the separation efficiency may be less important and the design rules can be adapted to operation and material constraints.

In this discussion reference may be made to the following symbols which are defined as follows:

| Symbol | Description | Units |
|---|---|---|
| A | Cross-sectional area of pipe | [m²] |
| c | Relation between pressure and density of gas | [s/m²] |
| $d_1$ | diameter of inlet nozzle in separator | [m] |
| dP | Pressure drop over orifice as percentage of range | [%] |
| dp | Pressure drop | [bar] |
| $F_c$ | Flow factor | [-] |
| g | gravitational acceleration | [m/s²] |
| H | Controller transfer function | [-] |
| $K_m$ | Flow factor for mass flow calculation (H9000) | [-] |
| $K_v$ | Flow factor for superficial velocity calculation (H9000) | [-] |
| $L_F$ | Length of flowline | [m] |
| M | Molecular mass | [kg/kmol] |
| $P_m$ | Pressure in orifice meter run | [bara] |
| $Q_m$ | Mass flow rate (liquid or gas) | [kg/hr(s)] |
| R | Universal gas constant | [J/mol K] |
| t | time | [s] |
| T | Temperature | [K] |
| $T_m$ | Temperature in orifice meter run | [K] |
| τ | controller action time | [s] |
| $U_m$ | Mixture velocity | [m/s] |
| $V_{liq}$ | Liquid volume | [m³] |
| $V_{sG}$ | Superficial velocity of gas | [m/s] |
| $V_{sL}$ | Superficial velocity of liquid | [m/s] |
| $\rho_G$ | Density of gas | [kg/m³] |
| $\rho_L$ | Density of liquid | [kg/m³] |

The diameter of the separator, D, is related to the diameter of the inlet nozzle $d_1$ which is ideally equal to the pipeline diameter. We selected D=4 $d_1$, so that for a 4" line we arrive at D≈400 mm. To enable the use of standard pipe material for the vessel body the internal diameter was set to 403 mm.

The diameter of the oil outlet nozzle can be equal to $d_1$. A swirl breaker is preferably applied.

The gas outlet nozzle is extended into the vessel and serves as a vortex finder. To reduce liquid re-entrainment the diameter may be increased to 1.5 $d_1$. However, for ease of construction this diameter was also taken as $d_1$.

Although a bottom (dollar) plate may be present, it should not be used in this application. Particularly during the start-up procedure a certain period of single phase liquid production is envisaged. This will lead to miss-operation if the bottom plate is applied. Also level excursions should be possible. The legs of the bottom plate, which serve as vortex spoilers have to be replaced by a number of side baffles.

The height of the vessel is determined by four major factors, i.e.
1) the space needed for the inlet and gas outlet configuration;
2) the minimum distance between the highest liquid level and the outlet nozzle,
3) the required slug catching volume;
4) the minimum liquid level during operation;

For a given vessel diameter the minimum gas volume is defined by factors 1 and 2. The maximum gas volume is determined by factors 1, 2 and 3. The required liquid volume ($V_{liq}$) can be calculated from the mixture velocity ($U_m$), the pipeline diameter ($d_1$) and the time required by the level controller to adjust the liquid level (τ):

$$\left|V_{liq} = \frac{\pi}{4} d_1^2 U_m \tau\right|$$

Using conservative estimates of the variables, for example $U_m$=2.8 m/s and τ=2.5 s, results in $V_{liq}$=0.06 m³ which corresponds with a separator height of 4.4 $d_1$.

According to the design rules mentioned above, the total height of the vessel amounts to 10.7 $d_1$, which is equal to 1.07 m for a pipeline diameter of 4 inch.

Figure 10:
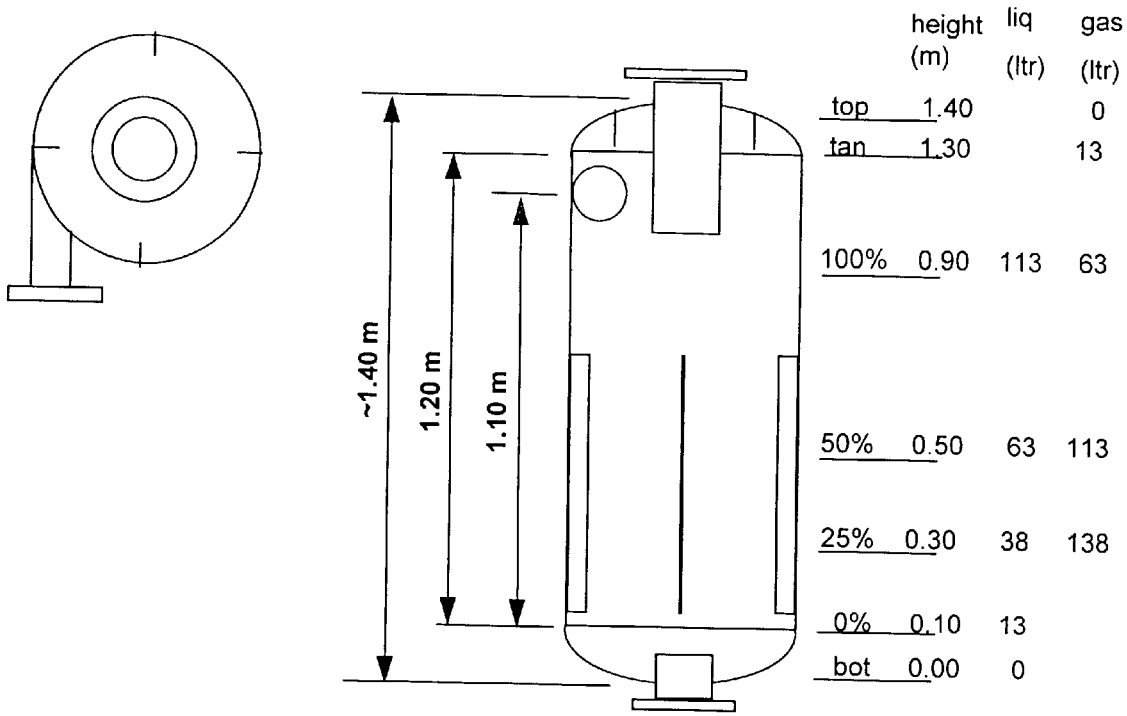
FIG. 10 is a diagram of a design of a mini-separator.

A mini-separator as represented in FIG. 10 should provide good results. The liquid capacity was increased with about 50% which would enable some freedom in the selection of the liquid set-point.

Some checks should be made on the resulting gas volume. It should be much smaller than the volume of the riser with the connecting pipe work (factor 0.25 or less) to enable pressurization during start-up.

The ratio of maximum and the minimum gas volume determines the pressure increase during the initial slug production stage which is needed to prevent the acceleration. In this context the pipe work between the gas outlet nozzle and the gas control valve should be as short as possible.

The design rules for both the liquid and gas control valves depend on the purpose envisaged for the vessel. This could be either the suppression of the continuous severe slugging flow pattern or the prevention of start-up slugs, transient slugs and the so-called rogue slugs (irregularly arriving slugs). Start-up and transient slugs are caused by the "sweeping" of the flow line during beaning-up of the wells after a shut-down or to increase the production (accidental or operational). Rogue slugs do occur occasionally apparently without any reason. Severe slugging can be predicted fairly well, hence the maximum flow rates are known with reasonable accuracy. Transient slugs and rogue slugs may occur at higher flow rates than severe slugging. Therefore, larger valves may be necessary for pressure and liquid control in the mini-separator.

Figure 12:
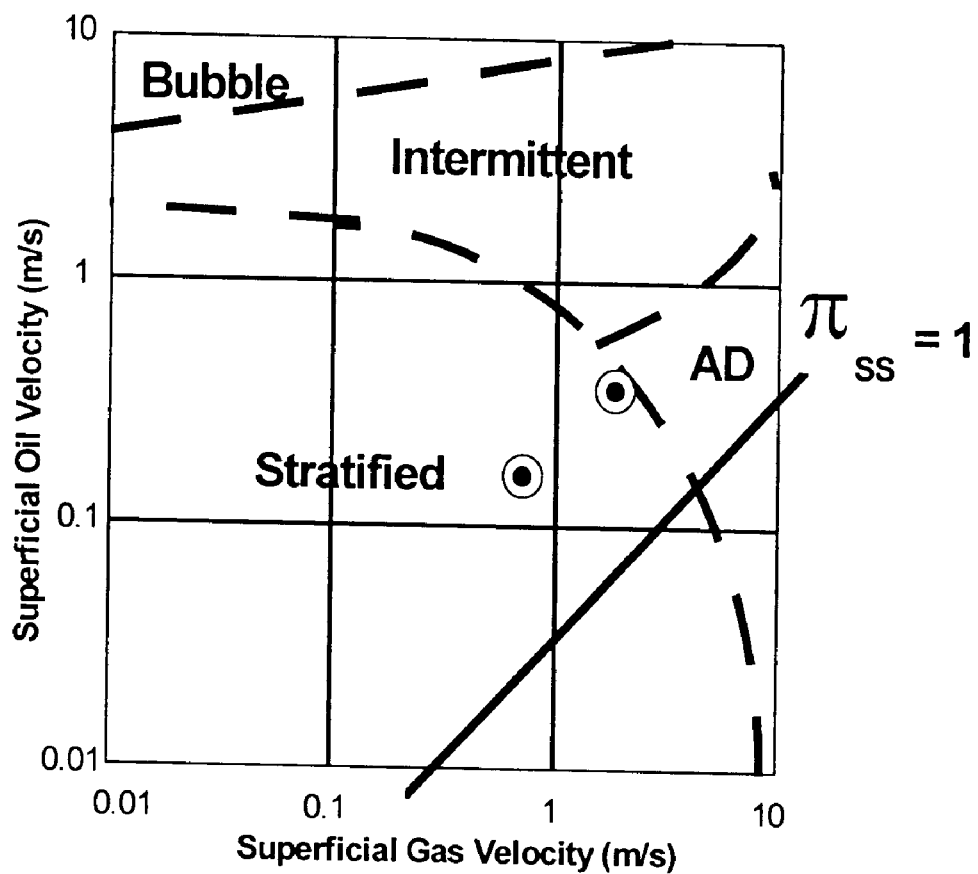
FIG. 12 is a flow pattern map for the 4 inch flowline with an inclination of −2°.

For severe slugging suppression the following "steps" can be followed:
1. With a pipeline design code a flowpattern map is produced for the pipeline diameter declining at −2° (FIG. 12). Pipeline conditions within the area between the $\Pi_{ss}$=1 line and the intermittent slug region will give severe slugging or unstable riser flow.
2. A line ($V_{sG}$=f(GOR,$V_{sL}$)) is constructed for a specific GOR of the well(s) producing through the pipeline.
3. The line (constructed in b, FIG. 12) crosses the stratified-annular dispersed boundary. Severe slugging is expected anywhere below the curve which describes the transition from stratified flow to intermittent/annular dispersed flow for $\Pi_{ss}$<1. The crossing gives the maximum condition where severe slug flow may occur.
4. These superficial velocities are converted to mass flow using the cross sectional area of the pipeline (A) and the respective densities:

$$M_L = \rho_L * V_{sL} * A|$$

$$M_G = \rho_G * V_{sG} * A|$$

5. Allowance should be made for the fact that during State 3 of the severe slugging cycle liquid is produced at the mixture velocity which may be a factor 3 to 5 higher than the actual liquid velocity. For the gas mass flow, a margin should be allowed because, during the start-up procedure of the controls an increased flow rate should be possible to speed-up the depressurization of the flow line after the last slug has been produced. Control valve calculations can be performed with the selected additional pressure drop, densities and the required mass flow to obtain a measure for the restrictions (Cv value) of the valves. Select the next larger Cv value from the valve manufacturer's list of sizes.

The flow measuring devices should be robust and have a large turn-down ratio. The maximum capacity is determined by the maximum flow through the control valves. When orifice metering is selected the appropriate sizes can be calculated, taking into account that several ranges can be realized by careful selection of the differential pressure transmitter(s). Other mass flow devices are possible such as vortex flow meters. Care should be taken that the viscosity of the liquid phase may jeopardize the turn-down of the instrument drastically.

The level in the mini-separator is a very important parameter in the control scheme. Therefore special attention was given to the instrumentation to measure this quantity. Ideally a capacitance level gauge should be used, because of its fast response time. Only one instrument connection is required as the sensing element is usually a dip stick. The liquid level is detected by variation of the di-electric constant of the medium surrounding it. In situations where the vessel has a small diameter, connection cannot be made on the top cap and a bridle or stand-pipe design may be used.

During the design stage it soon became apparent that an instrument of the type described above would have an extremely long delivery time and as a fallback option a simple delta-P measurement was included in the design. To this end two extra process connections were made on the vessel, i.e. one at the bottom and one at the top such that no liquid could enter the dry leg. Experience with the current vessel, however, proved that this was not the case.

Mini-Separator as Part of a Flowline

Figure 9:
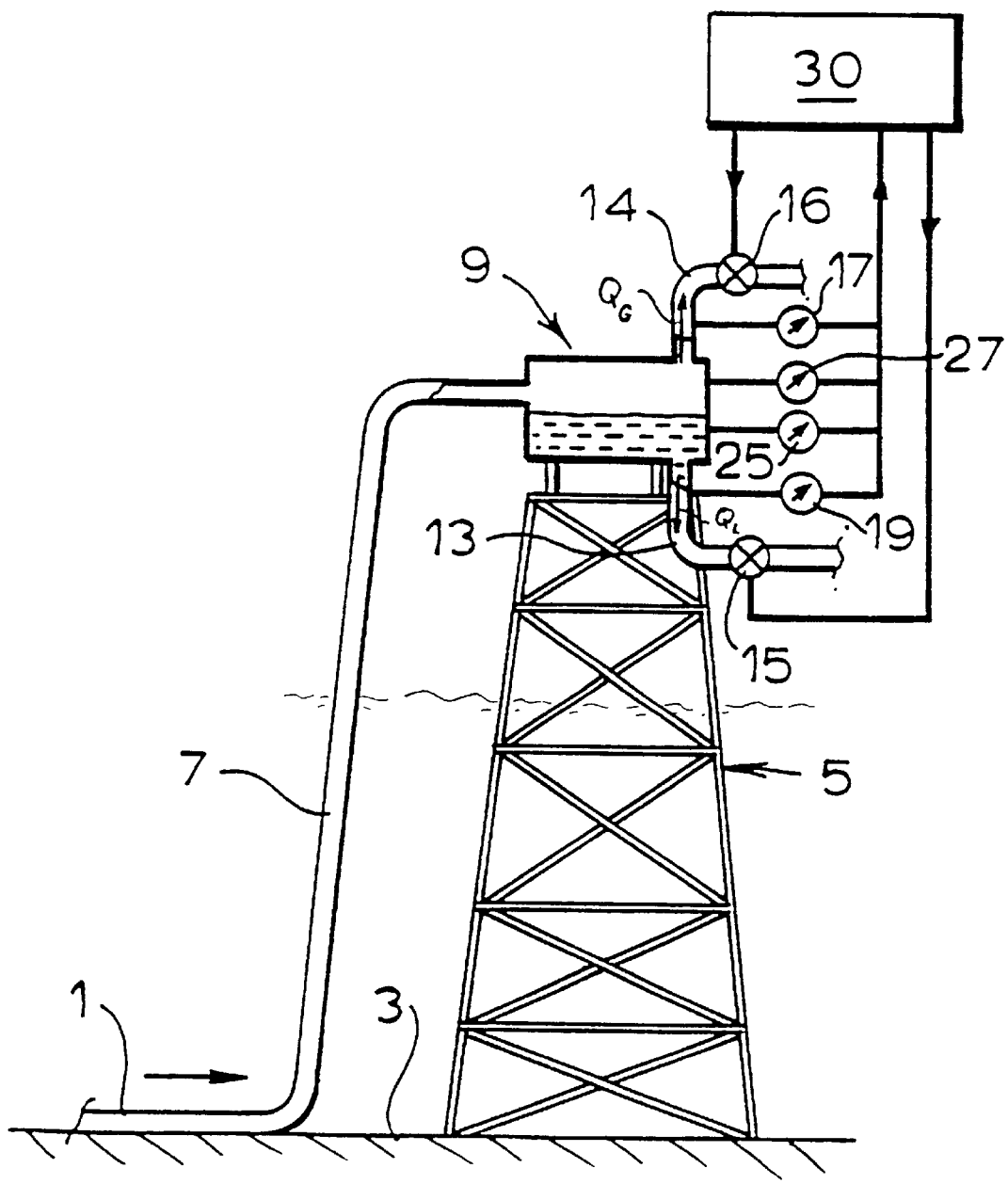
FIG. 9 is a schematic diagram of a flowline system for carrying out the method of the present invention.

Reference is made to FIG. 9 which schematically shows how the invention would comprise part of a flow line of an oil and/or gas production pipeline 1 extending on the seafloor 3 from a wellhead (not shown) of an oil and/or gas production well to an offshore platform 5 and a gas/liquid separator 9 having a liquid outlet conduit 13 and a gas outlet conduit 14. The liquid outlet conduit 13 is provided with a liquid flow control valve 15, and the gas outlet conduit is provided with a gas flow control valve 16. The valves 15 and 16 can be of any suitable type such as, for example, the vortex amplifier disclosed in The Oil Man, August 1987, pp. 82–85. A gas flow meter 17 is provided in the gas outlet conduit 14 and a liquid flow meter 19 is provided in the liquid outlet conduit 13. The separator 9 is further provided with a liquid level gauge 25 and a pressure gauge 27. A control system 30 is provided which receives signals from the gas flow meter 17, the liquid flow meter 19, the liquid level gauge 25, and the pressure gauge 27, which control system 30 controls the valves of 15 ad 16 in a manner depending on the signals received by the control system 30. The liquid outlet conduit 13 and the gas outlet conduit are in fluid communication with the interior of a slug-catching separator (not shown) located downstream the separator 9. The slug-catching separator is of a size considerably larger than separator 9.

During the start up of the system the liquid valve 15 is closed until the liquid level $L_{LIQ}$ in the separator 9 reaches a selected level, whereas the gas valve 16 is adjusted dynamically such that the pressure measured by the pressure gauge 27 is maintained at a selected level.

As soon as the liquid level $L_{LIQ}$ in the separator 9 has reached a selected level the system is automatically switched into the default total volumetric flow control mode shown in FIG. 5 and directly afterward the controllers PID 4 and PID 5 are connected to the two control valves of the mini-separator as in FIG. 6).

In the total volumetric flow control mode shown in FIG. 6 the liquid valve is controlled to maintain a liquid level $L_{LIQ}$ set point. In addition, the gas valve is controlled to maintain a total volumetric flow $Q_{LIQ}+Q_{GAS}$ set point. The actual flow rate $Q_{LIQ}+Q_{GAS}$ measured by the gas and liquid flow meters in the liquid and gas outlets. The sum of the output of the flow meters 17 and 19 (FIG. 9) is variable to be controlled. The set-point of the total volumetric flow controller FIG. 6 is given by a pressure controller PID 3 in combination with calculations which depend on the pipeline size and related factors, as would be apparent to those skilled in the art.

For transient liquid slugs, the total volumetric flow control scheme shown in FIG. 9 will not work due to the fact that the level controller is not bounded the total volumetric flow. It will open the liquid valve 15 completely to keep the liquid level on its set-point. Therefore, the liquid flow control mode of operation shown in Figure (no gas mode) is switched on when: (I) the liquid level $L_{LIQ}$ in the separator 9 reaches a threshold value or (ii) the liquid flow rate $Q_L$ in the liquid outlet 13 reaches a threshold value. The threshold value of the liquid flow rate $Q_L$ may depend on external factors such as the liquid level or liquid drainage capacity of the first stage separator. This threshold value can also be used as the set-point of the liquid flow controller. The set-point of the total volumetric flow remains constant during liquid flow control.

Liquid flow control prevents acceleration of the slug. When the liquid level in the mini-separator 9 is decreased and the liquid flow rate is below the threshold value, the total volumetric control mode shown in FIG. 5 is switched on again. In the total volumetric control mode, the compressed gas phase (behind the slug) can be produced without any gas surge.

The following experimental work and example will serve to illustrate specific embodiments of the invention disclosed herein. These examples are intended only as a means of illustration and should not be construed as limiting the scope of the invention in any way. Those skilled in the art will recognize many variations that may be made without departing from the spirit of the disclosed invention.

EXPERIMENTAL

Experiments were run to test the severe slugging suppression method of the present invention in the field. An oil and gas production platform was selected characterized by a 15.8 km long 4 inch test line running from a remote sub-sea location to the main platform. Prior to engaging in a full trial a number of flow tests were performed on the test line to ascertain that severe slugging could be induced as proposed. Severe slugging was found to occur at reduced flow rates. The severe slugging flow pattern, induced in the testline as before, was successfully suppressed in a series of test runs where the control system was switched on. When the control system was switched on, a steady-state was obtained after a number of severe slugging cycles. The steady-state was maintained for several hours. After this period the controls were switched off and the severe slugging pattern re-established itself. The tests showed the method and apparatus of the invention can be employed successfully in practice. The control equation was shown to be scalable and adaptable.

Figure 11:
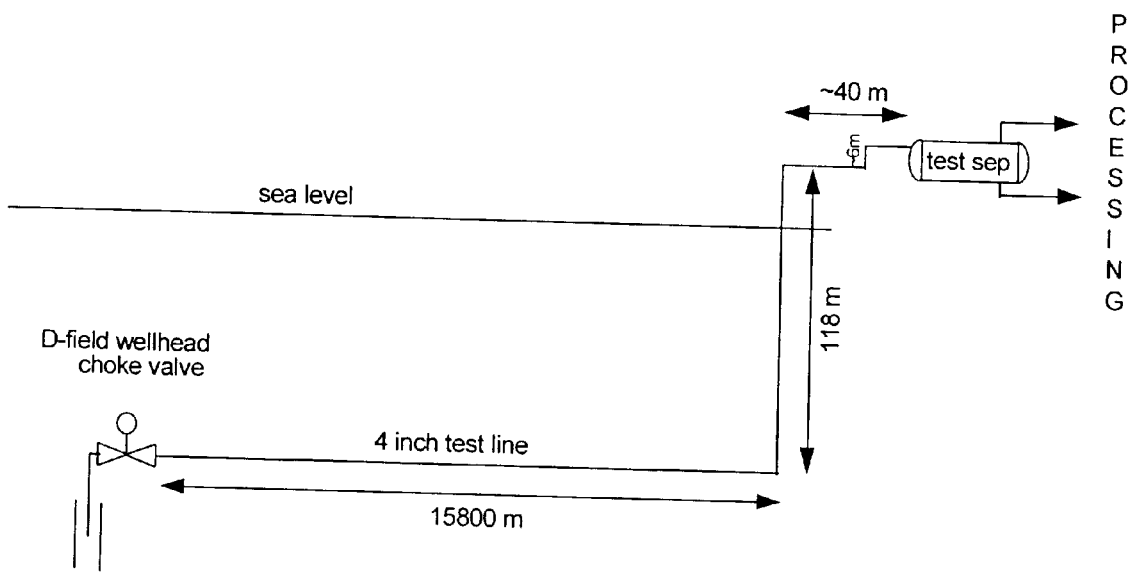
FIG. 11 is a schematic representation of the system used for the field example.

The previously mentioned 4" test line was connected to a separator ("test separator") which has a capacity of 8 m³. This horizontal separator was suitable for oil/water/gas separation and was equipped with level and pressure control instrumentation as well as gas, oil and water flow rate metering. The fact that it was not normally used for regular production means that the tests could be accommodated without a major production deferment. A disadvantage, however, was the horizontal distance between the top of the riser and the test separator. The connecting pipe work included several bends, short vertical sections, changes in diameter and passes through the test header. A schematically drawing of the flow line riser system is given in FIG. 11. The flow rate can be remotely regulated by means of a well-head choke valve.

Calculation with a steady state pipeline design code predicted severe slugging in the 4" test line at reduced flow rates. The flow pattern map for a 4" pipe declining at −2°, is given in FIG. 12. The $\pi_{ss}=1$ line is sketched assuming an average hold-up of 0.45 in the "horizontal" flowline. It can be calculated that this line corresponds to a GOR of 660.

From the information provided, an average GOR of 150 could be calculated and oil flow rates of 100 and 300 m$^3$/day were taken as input. Further reduction of the flow rate or reduction of the GOR will intensify the slugging phenomena which will be favorable for the tests.

FIELD EXAMPLE

Figure 13:
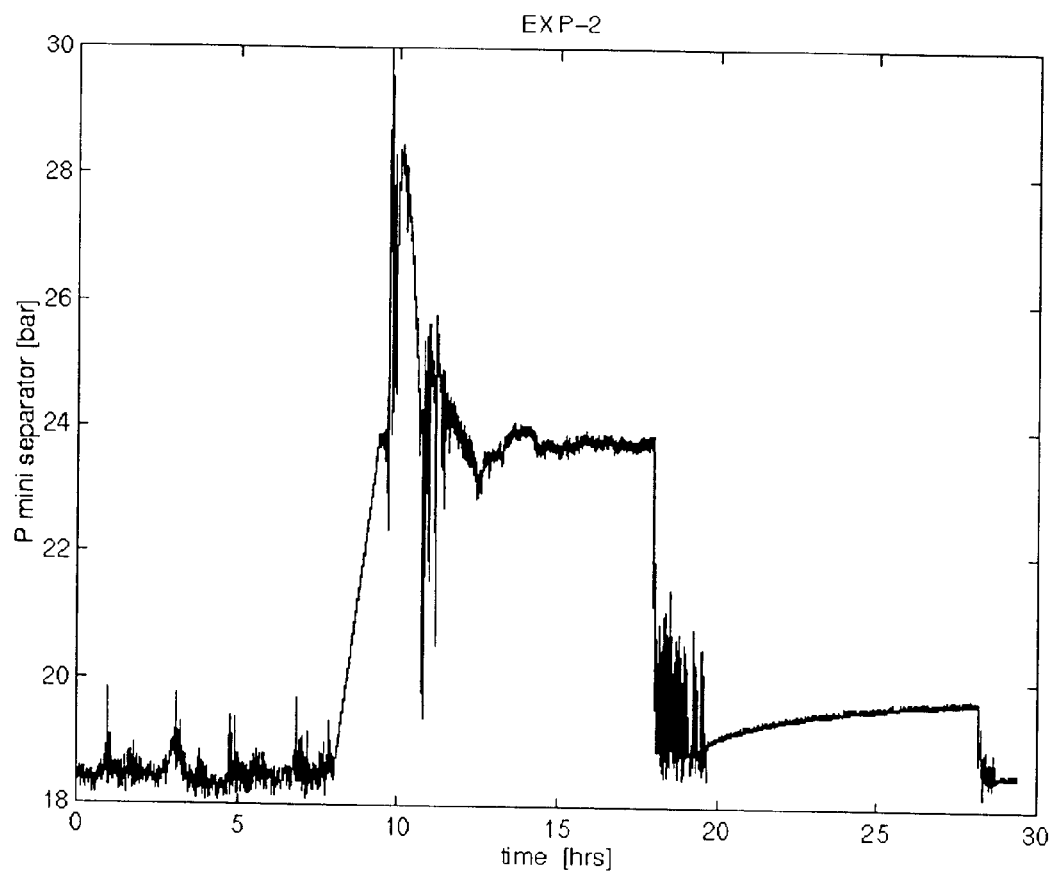
FIG. 13 is a graph representing pressure in the mini separator.
Figure 14:
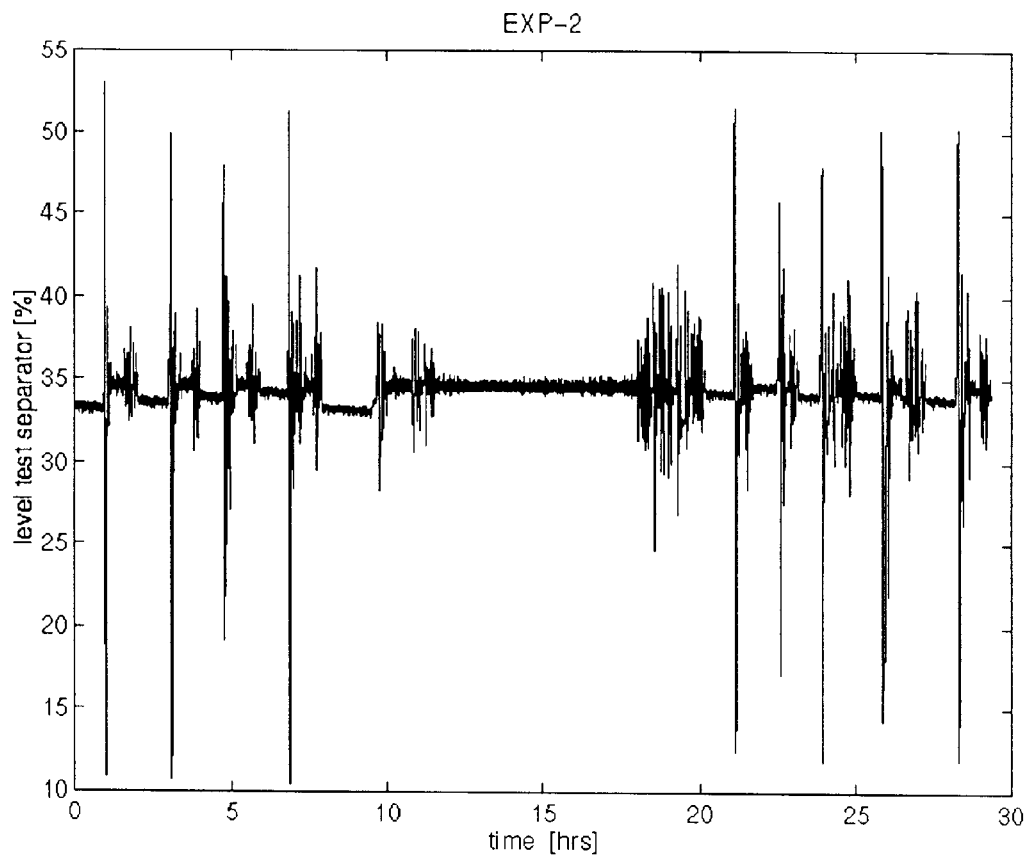
FIG. 14 is a graph representing the level fluctuations at the test separator.
Figure 15:
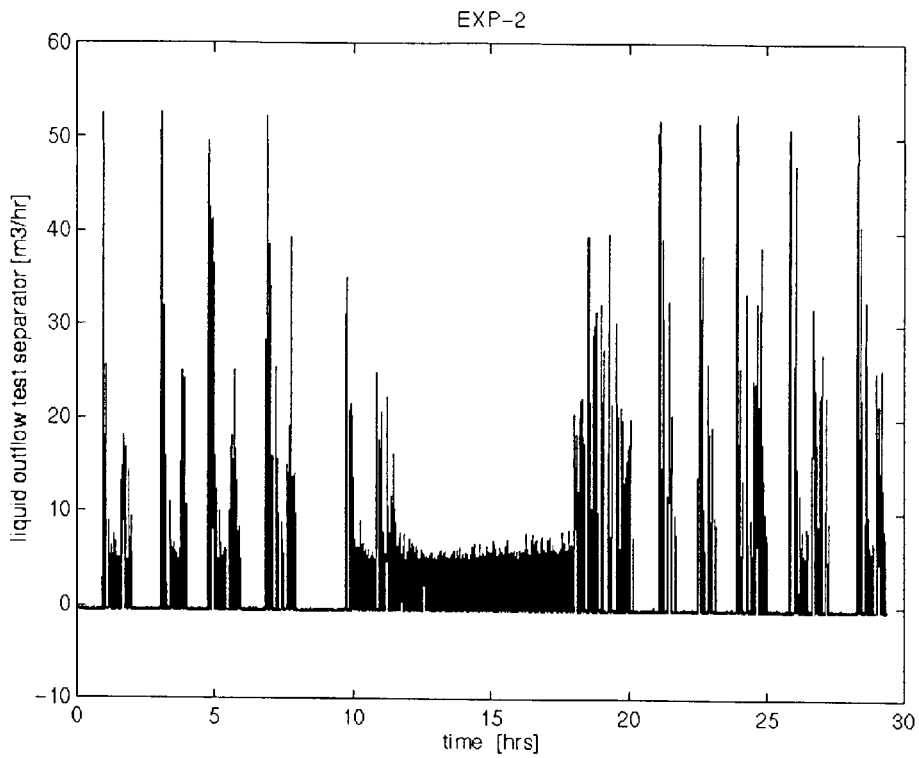
FIG. 15 is a graph representing liquid outflow of the test separator.

The objective of this experiment was to use the SSD to suppress severe slugging. The severe slugging flow pattern was established with a choke setting of 3.3% and an attempt to start-up the SSD was done. Four severe slugging cycles passed before the by-pass to the mini-separator was opened again. (See FIGS. 14 and 15). As in the first experiment, the pressure set point of the mini-separator was 24 bar. The suppression device controls were stepped from state 1 through state 2 and state 3. The pressure set-point of 24 bar was reached at about 1.5 hr after opening of the by-pass and this pressure was controlled until the head of the slug reached the vessel. This build-up period (see FIG. 13; from t=8 hr to t=9.5 hr) is substantially longer than the slug build-up during severe slugging. The reason for this is that the maximum pressure in the flow line will be increased by the pressure drop over the control system. Although the pressure fluctuations at the end of the flowline (riser foot) are in the order of the static head of the riser filled with oil (10 bar), the fluctuations at the inlet are dampened to about 5 bar.

During the pressure reduction phase, the gas control valve was completely steered open for about one hour. In this period of only gas production, the set point for the mixture velocity came gradually down to a level at which the pressure in the mini-separator could be controlled by the gas valve. After a few minor (transient) slugs were arrived, the mixture velocity set point leveled out in a period of 4–5 hours. During this and the following period, the flow into the test separator remained very stable (see FIG. 14). No level excursions have been seen since the arrival of the last severe slug. The oil production rate was shown to be very stable from the start-up onwards.

After 10 hours of operating the SSD, the pressure set point was reduced in order to blow down the SSD vessel. To enhance the depressurization, the liquid valve was taken to manual and gradually steered open. Due to the depressurization of the flow line several transient slugs were generated in the flow line. When the depressurization was completed, the by-pass valve was opened and the SSSD inlet closed. The severe slugging pattern re-appeared with a similar pattern as before the suppression experiment, meaning that the flow rates had not changed and the measured results were results of the SSD.

Example Suppressing Transient Slug

To create a transient slug, the production of a 4" test line was decreased from 8 m$^3$/hr to 5 m$^3$/hr. While decreasing the flow in the flowline, the experiment was interrupted by two emergency shutdowns of the platform. The emergency shutdown gave the opportunity to test the SSD during a start-up of the production. Focusing on the start-up after the second emergency shutdown, the pressure in the flow line was increased above 30 bar(maximum range of pressure sensor on the mini-separator) during the emergency shutdown. The pressure was slowly released by opening the gas valve (indicated by the gas flow meter) of the mini-separator until the pressure was in range of the pressure sensor. At that point the SSD was switched on with a setpoint of 14.6 m$^3$/hr ($U_{sl}$=0.75 m/s) for the maximum liquid production. The production was directly under control. Due to the emergency shutdown, a start up slug was expected; the increased liquid production was also observed. During the start-up the set-point of the maximum liquid production was manually changed (to speed up the start), because it was unknown what slug lengths could be expected. Normal production was reached after ca 1 hour. After the start-up of the production in the 4" pipeline, the transient slug experiment was resumed. It was assumed that after 5 hours, after start up after emergency shutdown, the flowline was in a new steady state with a production of 5 m$^3$/hr. The production was stopped for 1 hour and then a new start-up of the flowline was performed.

After the experiences with the start-up after the emergency shutdown, the adaptation of the maximum liquid production was automated within an operating window (low and high limit). In the first hours a high liquid production was encountered which was smoothly controlled by the SSD. The set-point depends on the pressure measured in the mini-separator. During a period of increased production, the average pressure in the mini-separator will increase, and to compensate for the increased pressure the set-point of the maximum liquid flow (coupled with the total volumetric flow) will also increase. The production fluctuated somewhat during the first hours after the start-up, however, however except for the first 20 minutes, a large transient slug was not detected.

After several hours of normal production the experiment was repeated without SSD control. The flow was decreased to an average liquid production of ca 6 m$^3$/hr. The outlet flows were even higher than during the transient experiment with SSD control switched on. Due to these flows the build-up of liquid in the pipeline was not enough to create a large transient slug. Production was stopped for 1 hour and then a new start-up of the flowline was performed just like the first transient slug experiment. A large liquid slug was encountered only in the first five minutes, and after that the normal slugging pattern was measured.

Figure 16:
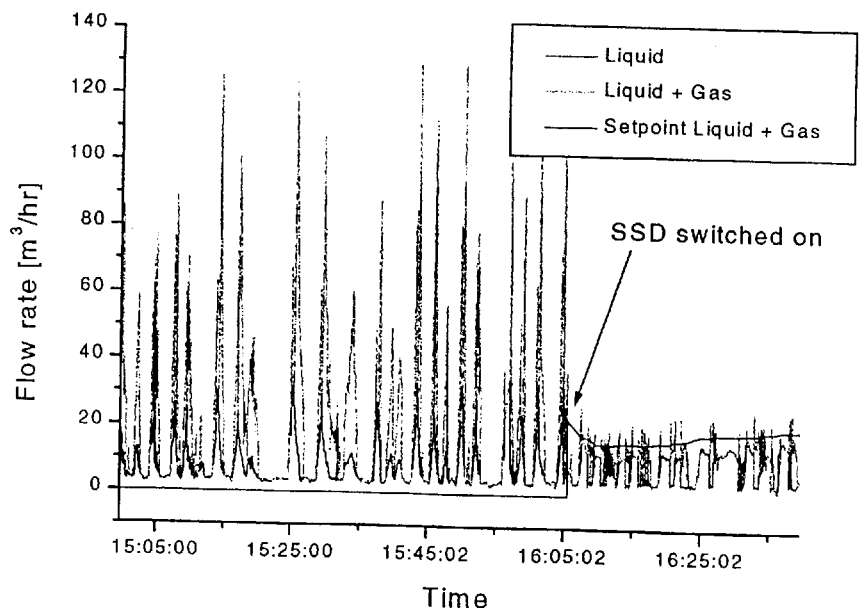

The differences between no control and SSD control are demonstrated by FIG. 16, which shows a period of uncontrolled flow after which the SSD was switched on and the outlets are properly controlled almost instantaneously.

We claim:

1. A method for suppressing and controlling liquid slugs and gas surges in a stream of multiphase fluid flowing from flowline into a gas/liquid separator having a liquid outlet with a liquid flow control valve and a gas outlet with a gas flow control valve, sensors for measuring control variables, and a control system for monitoring said control variables and adjusting said control valves, which comprises:
   a) Measuring at least one control variable selected from the group of the liquid level $L_{LIQ}$ in the separator, the liquid flow rate $Q_L$ in the liquid outlet, the gas flow rate $Q_G$ in the gas outlet, the sum $(Q_L+Q_G)$ of the liquid flow rate in the liquid outlet and the gas flow rate in the gas outlet, and the fluid pressure (P) at or near the separator;

b) Inputting said measurements to a control system with a controller for receiving said values as a mathematical number and responding to preset numbers;

c) Said control system adjusting said liquid and gas flow control valves to reduce a difference between a selected control variable ($Q_L+Q_G$, $Q_L$, $Q_G$, $P$, $L_{LIQ}$) and a pre-set reference value of the selected control variable; and d) Changing the selected control variable ($Q_L+Q_G$, $Q_L$, $Q_G$, $P$, $L_{LIQ}$) from time to time automatically if one or more control variables reaches a pre-set value.

2. The method of claim 1 wherein the sensors monitor pressure, fluid level, gas, and liquid flow.

3. The method of claim 2, wherein during normal operation the selected control variable is the sum of the liquid flow rate in the liquid outlet and the gas flow rate in the gas outlet, and further comprising that when the liquid level in the separator or the liquid flow rate in the liquid outlet reaches a pre-set value the selected control variable is changed to liquid flow rate in the liquid outlet.

4. The method of claim 3 wherein the selected control variable is changed back again into the sum of liquid flow rate in the liquid outlet and the gas flow rate in the gas outlet when said liquid level in the separator or liquid flow rate in the liquid outlet is below said pre-set value.

5. The method of claim 3 further comprising that during normal operation the sum of the liquid flow rate in the liquid outlet and the gas flow rate in the gas outlet is controlled by adjusting the position of the gas flow rate control valve by means of a mixture flow controller which is set to maintain a total volumetric flow set-point and by adjusting the position of the liquid flow rate control valve by means of a liquid level controller.

6. The method of claim 5, wherein if the liquid flow rate is selected as the control variable the gas flow control valve is substantially closed and the liquid flow control valve is adjusted by a liquid flow controller which is set to maintain a liquid flow set-point.

7. The method of claim 6, wherein, if the liquid flow rate is selected as the control variable, the gas flow control valve is substantially closed by closing off or choking the gas flow control valve until the gas pressure reaches an unsafe level at which the gas flow control valve is operated as a pressure relief valve.

8. A system/apparatus for suppressing and controlling liquid slugs in a stream of multi-phase fluid flowing from a flowline into a gas/liquid separator or slugcatcher having a liquid outlet provided with a liquid flow control valve and a gas outlet provided with a gas flow control valve, the system comprising a control system for dynamically adjusting the position of said gas and liquid control valves in response to measurement of at least one control variable selected from the group of liquid level in the separator, the liquid flow rate of in the liquid outlet, the gas flow rate in the gas outlet, and the sum of the liquid and gas flow rates in said outlets, said adjusting of said liquid and gas flow control valves being done to reduce the difference between a selected control variable and a pre-set reference value of the selected control variable wherein the control system is adapted to change the selected control variable ($L_{LIQ}$, $Q_L$, $Q_G$, $Q_L+Q_G$) from time to time in response to which said gas and liquid control valves are adjusted if a selected control variable has reached a pre-set value.

9. The system of claim 8, wherein the control system is set during normal operation so the liquid flow control valve is adjusted such that variations of the liquid level in the separator are minimized and the gas flow control valve is adjusted such that variations in the sum of the liquid and gas flow rates in said outlet are minimized, and wherein the control system substantially closes the gas flow control valve and the liquid flow control valve is adjusted such that variations in the liquid flow rate in the liquid outlet are minimized if either the liquid level in the separator reaches a threshold level or if the liquid flow rate in the liquid outlet reaches a threshold value.

10. The system of claim 8 wherein the flowline forms part of a hydrocarbon fluid production system through which a mixture of crude oil, condensate, water and/or natural gas is produced from one or more hydrocarbon fluid production wells.

11. A system/apparatus for suppressing and controlling liquid slugs in a stream of multi-phase fluid flowing from a flowline into a gas/liquid separator or slugcatcher having a liquid outlet provided with a liquid flow control valve and a gas outlet provided with a gas flow control valve, the system comprising a control system for dynamically adjusting the position of said gas and liquid control valves in response to measurement of at least one control variable selected from the group of liquid level in the separator, the liquid flow rate of in the liquid outlet, the gas flow rate in the gas outlet, and the sum of the liquid and gas flow rates in said outlets, said adjusting of said liquid and gas flow control valves being done to reduce the difference between a selected control variable and a pre-set reference value of the selected control variable wherein the control system is adapted to change the selected control variable ($L_{LIQ}$, $Q_L$, $Q_G$, $Q_L+Q_G$) from time to time in response to which said gas and liquid control valves are adjusted if a selected control variable has reached a pre-set value wherein the separator is a primary separator and wherein the liquid and gas outlets flow into a secondary separator or slugcatcher which has a larger volume than the primary separator.

12. The system of claim 8 wherein the separator is mounted on an offshore platform, on the seabed, onshore, or downhole in an oil and/or gas production well.

* * * * *